(12) United States Patent
Sachs et al.

(10) Patent No.: US 9,521,149 B2
(45) Date of Patent: Dec. 13, 2016

(54) MEANS AND METHOD FOR CONTROLLING NETWORK ACCESS IN INTEGRATED COMMUNICATIONS NETWORKS

(75) Inventors: Joachim Sachs, Aachen (DE); Ian Herwono, Stowmarket (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2025 days.

(21) Appl. No.: 11/993,669

(22) PCT Filed: Jun. 28, 2005

(86) PCT No.: PCT/SE2005/001018
§ 371 (c)(1),
(2), (4) Date: Dec. 21, 2007

(87) PCT Pub. No.: WO2007/001215
PCT Pub. Date: Jan. 4, 2007

(65) Prior Publication Data
US 2010/0037284 A1 Feb. 11, 2010

(51) Int. Cl.
*H04L 29/06* (2006.01)
*H04W 12/08* (2009.01)
(Continued)

(52) U.S. Cl.
CPC .......... *H04L 63/102* (2013.01); *H04L 43/087* (2013.01); *H04L 43/0847* (2013.01);
(Continued)

(58) Field of Classification Search
USPC ...... 726/1, 2, 3, 4; 709/225; 370/229, 236.1, 370/328, 331, 332; 455/436, 450, 452.2
See application file for complete search history.

(56) References Cited

U.S. PATENT DOCUMENTS 7,113,782 B2 * 9/2006 Lucidarme ................ 455/432.1
7,328,010 B2 * 2/2008 Turina et al. ............. 455/426.1
(Continued)

FOREIGN PATENT DOCUMENTS

EP 1398975 A1 * 3/2004
WO WO 2004/045224 A1 5/2004
(Continued)

OTHER PUBLICATIONS

3rd Generation Partnership Project, "3GPP Technical Report 25.881—Improvement of RRM across RNS and RNS/BSS", Release 5, 2002, 44 pages.*
(Continued)

*Primary Examiner* — Victor Lesniewski

(57) ABSTRACT

Methods may be used by a Multi Radio Resource Management function for assisting the control of a User Terminal's access to an access network domain in a radio communications network. The MRRM function is arranged to communicate with a first radio access network domain to which a first authorization entity, A1, authorizes UTs access, and to communicate with at least a second radio access network domain to which a second authorization entity, A2, authorizes UTs access. The methods include receiving at least one radio resource information message, RRIM, from the second access network domain, the message comprising at least one parameter value, $X_2$, of at least one radio resource parameter, $P_2$, related to the traffic load and/or the radio resource consumption and/or the characteristics of at least one radio traffic channel, associated with said second access network domain. The methods further includes: defining a criterion, C, for granting the UT access to the second access network domain, wherein C is a function of at least $X_2$; establishing whether C is fulfilled or not for UT; and instructing A2 that UT is authorized to access the second access network domain if C is fulfilled for UT and instructing A2 that UT is
(Continued)

not authorized to access the second access network domain if C is not fulfilled for UT.

11 Claims, 13 Drawing Sheets

(51) Int. Cl.
  *H04L 12/26* (2006.01)
  *H04W 12/06* (2009.01)
  *H04W 28/18* (2009.01)
  *H04W 74/00* (2009.01)
  *H04W 84/12* (2009.01)

(52) U.S. Cl.
  CPC ........ *H04L 43/0888* (2013.01); *H04L 63/061* (2013.01); *H04L 63/0869* (2013.01); *H04L 63/0892* (2013.01); *H04W 12/06* (2013.01); *H04W 12/08* (2013.01); *H04W 28/18* (2013.01); *H04W 74/00* (2013.01); *H04W 84/12* (2013.01)

(56) References Cited

U.S. PATENT DOCUMENTS

| | | | |
|---|---|---|---|
| 7,408,902 B2* | 8/2008 | Zeira et al. | 370/333 |
| 7,471,655 B2* | 12/2008 | Gallagher et al. | 370/329 |
| 7,650,143 B2* | 1/2010 | Jagadeesan et al. | 455/417 |
| 7,835,320 B2* | 11/2010 | Magnusson et al. | 370/329 |
| 7,864,795 B2* | 1/2011 | Barbaresi et al. | 370/459 |
| 7,941,154 B2* | 5/2011 | Barbaresi et al. | 455/451 |
| 2003/0126464 A1* | 7/2003 | McDaniel et al. | 713/201 |
| 2005/0152270 A1* | 7/2005 | Gomez Paredes et al. | 370/229 |
| 2006/0182061 A1* | 8/2006 | Naghian | 370/331 |
| 2006/0239207 A1* | 10/2006 | Naghian | 370/254 |
| 2007/0165537 A1* | 7/2007 | Magnusson et al. | 370/254 |
| 2007/0249359 A1* | 10/2007 | Barbaresi | 455/450 |
| 2008/0304455 A1* | 12/2008 | Simonsson et al. | 370/338 |
| 2009/0207811 A1* | 8/2009 | Zhu et al. | 370/332 |
| 2011/0249617 A1* | 10/2011 | Desorbay et al. | 370/328 |

FOREIGN PATENT DOCUMENTS

| | | |
|---|---|---|
| WO | WO 2005/015938 A1 | 2/2005 |
| WO | WO 2005/055524 A1 | 6/2005 |
| WO | WO 2005079034 A1 | 8/2005 |

OTHER PUBLICATIONS

Durham, D.; Boyle, J.; Cohen, R.; Herzog, S.; Rajan, R.; Sastry, A.; "The COPS (Common Open Policy Service) Protocol", Network Working Group, Request for Comments: 2748, IETF, Jan. 2000, 39 pgs.*

* cited by examiner

MEANS AND METHOD FOR CONTROLLING NETWORK ACCESS IN INTEGRATED COMMUNICATIONS NETWORKS

TECHNICAL FIELD OF THE INVENTION

The invention relates generally to integrated radio communications networks, and more specifically to means and methods for assisting the network access control in such integrated networks.

BACKGROUND

Internetworking and the integration of various radio access networks is a general trend within the field of radio communications networks in order to improve the service e.g. regarding coverage and capacity. A general desire is to find efficient means and methods making various radio access networks more compatible, allowing a smooth integration of the physical networks as well as the services. A general problem is thus to find efficient means and methods allowing a smooth integration of various radio access networks. Furthermore, there is a need to find efficient means and methods providing a possibility for smooth handover schemes, efficient interference suppression and access control schemes, in such integrated networks. Important problems relate to how to handle/improve radio link quality control, decrease signaling, packet delay etc. in an efficient way for such integrated networks. Thus, it is a general problem to find efficient means and methods improving the network access characteristics and handover characteristics of such integrated networks.

FIG. 1 illustrates the basic architecture of a cellular radio network, i.e. a first radio access network, in form of a UTRAN (Universal Terrestrial Radio Access Network) network, connected to the Internet 170 and a wireless data network, i.e. a second radio access network, in form of a WLAN (Wireless Local Area Network). The WLAN normally comprises at least one radio Access Point, AP, 165 connected to an Access Point Controller, APC, 162. The cellular radio network comprises a GGSN 110 connected to a SGSN 120 which in turn is connected to a RNC 130. A dual mode UT (User Terminal) 140, having both UTRAN and WLAN capability, can establish a UTRAN radio connection through it's first data port 141 with Base station Node B 150 and a WLAN radio connection through it's second data port 142 with the AP 165 of the WLAN. Node B 150 is connected to RNC 130.

The UT's 140 authorization to access the UTRAN network is in a conventional manner investigated by a 3GPP Authorization, Authentication and Accounting entity AAA1, 1310, before the UT 140 can establish a communication session through the UTRAN network. The AAA1 1310 communicates in a conventional manner with a HLR (Home Location Register) and a VLR (Visiting Local Register), not illustrated in FIG. 1, in order to establish whether UT 140 is authorized to access the UTRAN network. The AAA1 1310 may reside in one of the UMTS core network nodes, e.g. in the SGSN 120, or may reside in a stand alone AAA1 server, 1310, connected e.g. with the SGSN 120, as illustrated in FIG. 1.

The UT's 140 authorization to access the WLAN network is similarly, in a conventional manner, investigated by a WLAN Authorization, Authentication and Accounting entity, AAA2, installed in server a 1630, e.g. an AAA-server, before the UT 140 can establish a communication session through the WLAN network. The APC 162 communicates for this purpose in a conventional manner with the AAA2 at server 1630, e.g. being a RADIUS (Remote Authentication Dial-In User Service) or a DIAMETER server, as illustrated in FIG. 1. Alternatively, AAA2 may e.g. reside in the APC node 162.

The WLAN may in a conventional manner be connected to the SGSN 120 or to the GGSN 110 or to the Internet 170, FIG. 1 illustrates the case wherein it is connected to the GGSN 110, possibly via an AR (Access Router) and/or an IP-network, not illustrated in FIG. 1. A data communication session can be established between the UT 140 and a communicating party connected to the Internet 170, e.g. by means of a conventional PDP (Packet Data Protocol) context session between the UT 140 and the GGSN 110, in accordance with the 3GPP standard for packet radio data services, or by means of a conventional data session through the WLAN, after establishing that the UT 140 is authorised to access the UTRAN/WLAN network.

A problem associated with the network architecture depicted in FIG. 1 is that there is no efficient control of the radio resources of the entire integrated UTRAN-WLAN network, or traffic load balancing between the UTRAN network and the WLAN network, but instead the radio resources are managed separately on a local network basis, i.e. the RNC 130 manages and controls the radio resources of the UTRAN network and the APC 162 and/or the APs manages and controls the radio resources of the WLAN network, which constitutes a problem for obtaining an efficient exploitation of the entire UTRAN-WLAN integrated network.

More specifically, it is a problem how to obtain a cost efficient physical control of a UT's (140) access to the particular sub-networks, i.e. the WLAN and the UTRAN.

SUMMARY OF THE INVENTION

The present invention seeks to mitigate/solve above problems.

It is an object of the present invention to provide methods and means allowing a cost efficient integration of various radio access networks.

It is a further object to improve the access characteristics and handover characteristics of such integrated networks.

It is still a further object of the present invention to increase the total capacity of such integrated networks.

It is a further object of the present invention to provide cost efficient methods and means for integrating a first radio access network domain to which a first authorization entity, A1, authorizes user terminals access, with a second radio access network domain to which a second authorization entity, A2, authorizes user terminals access.

According to a first aspect, the invention achieves these objects by providing a method for assisting the control of a User Terminal's, UT's, access to an access network domain in a radio communications network, said method to be used by a Multi Radio Resource Management, MRRM, function of said communications network, said MRRM function being arranged to communicate with a first radio access network domain to which a first authorization entity, A1, authorizes UTs access, and to communicate with at least a second radio access network domain to which a second authorization entity, A2, authorizes UTs access, said method comprising the steps of:

receiving at least one radio resource information message, RRIM, from said second access network domain, said message comprising at least one parameter value, $X_2$, of a radio resource parameter, $P_2$, related to the traffic load and/or the radio resource consumption and/or the characteristics of at least one radio traffic channel, of said second access network domain, defining a criterion, C, for granting said UT access to said second access network domain, wherein said C is a function of at least said parameter value, $X_2$, establishing whether said criterion, C, is fulfilled or not for said UT, instructing said second authorization entity, A2, that said UT is authorized to access said second access network domain if said criterion, C, is fulfilled for said UT and instructing said second authorization entity, A2, that said UT is not authorized to access said second access network domain if said criterion, C, is not fulfilled for said UT.

In one embodiment, the method further comprises the steps of:

receiving at least one radio resource information message, RRIM, from said first access network domain, said message comprising at least one parameter value, $X_1$, of a Parameter, $P_1$, related to the traffic load, and/or the radio resource consumption and/or the characteristics of at least one radio traffic channel, of said first access network domain, defining said criterion, C, to be a function of at least said parameter value, $X_1$.

In one embodiment, said $X_2$ represents a total traffic load associated with said second access network domain in terms of throughput (Kb/s), total number of served users (UTs), interference value (e.g. in terms of W or SIR), total number of channel access collisions, transmission power (W), or represents a radio resource consumption in terms of transmission power (W), total number of served UTs, total number of used codes or sub-carriers or time slots, associated with said second access network domain, or represents a radio channel quality of said UT, e.g. in terms of a SNR-value or a SIR-value or a BER-value or a FER-value or throughput-value (Kb/s) or packet delay value (ms).

In one embodiment, said $X_1$ represents a total traffic load associated with said first access network domain in terms of throughput (Kb/s), total number of served users (UTs), interference value (SIR), total number of channel access collisions, transmission power (W), or represents a radio resource consumption in terms of transmission power (W), total number of served UTs, total number of used codes or sub-carriers or time slots, associated with said first access network domain, or represents a radio channel quality of said UT, e.g. in terms of a SNR-value or a SIR-value or a BER-value or a FER-value or throughput-value (Kb/s) or packet delay value (ms).

In one embodiment, said first access network domain forms a 3GPP cellular radio network and said second access network forms a wireless data network according to an IEEE 802 standard or according to a standard Internet protocol for mobile applications, MIP.

In one embodiment, the definition of said criterion C comprises the following steps:

defining a maximum tolerable threshold value, $X_{2MAX}$, for said radio resource parameter $P_2$, estimating the effective value, $X_{2EST}$, of said parameter $P_2$ as a consequence of said UT being granted access to said second access network domain, granting said UT access to said second access network domain only if said $X_{2EST}$ is below said $X_{2MAX}$.

Said parameter $X_{2MAX}$ may e.g. represent a total traffic load in terms of throughput (Kb/s), or a total number of served users (UTs), or an interference level value, (SIR), or a number of channel access collisions, or a transmission power (W), associated with said second access network domain or an access point of said domain, or represents a radio resource consumption in terms of transmission power (W), or a total number of served UTs, or a number of used codes or sub-carriers or time slots, associated with said second access network domain or an access point of said domain, or represents a QoS parameter value associated with said UT, associated with said first access network domain or a specific radio base station of said first access network domain, or wherein said $X_{2MAX}$ represents the radio channel quality of said UT currently communicating through said first access network domain, in terms of a BER-value or a FER-value or packet delay value (ms). $X_{2MAX}$ may represent a QoS value associated with a communication session of said UT, e.g. in terms of packet delay or a BER or FER In one embodiment, the definition of said criterion C comprises the following steps:

defining a minimum tolerable threshold value, $X_{2MIN}$, for said radio resource parameter $P_2$, being a QoS value requested by said UT, estimating the effective value, $X_{2EST}$, of said parameter $P_2$ as a consequence of said UT being granted access to said second access network domain, granting said UT access to said second access network domain only if said $X_{2EST}$ exceeds said $X_{2MIN}$.

The QoS value requested by said UT may e.g. be bit rate (BR), packet delay, delay jitter, security requirement settings of said UT, acceptable BER or FER, associated with a communication session of said UT.

In one embodiment, the step of defining said C comprises the following steps:

choosing a current parameter value, $X_1$, of said first access network domain, being a parameter value representing the total traffic load associated with said first access network domain or a specific base station of said first access network domain with which said UT is currently communicating, estimating an effective value of a corresponding parameter, $X_{2EST}$, for said second access network domain in case a communication session of said UT is handed over to said second access network domain, said $X_{2EST}$ being a parameter value representing the total traffic load associated with said second access network domain or a specific access node, AP, of said second access network domain, defining said C so as to grant said UT access to said second access network domain only if said estimated $X_{2EST}$ is below said current $X_1$.

Said parameters $X_1$ and $X_{2EST}$ may e.g. represent a total traffic load in terms of throughput (Kb/s), or a total number of served users (UTs), or an interference level value (SIR), or a number of channel access collisions, or a transmission power (W), associated with said access network domains respectively, or represents a radio resource consumption in terms of transmission power (W), or a total number of served UTs, or a number of used codes or sub-carriers or time slots, associated with said access network domains respectively.

In one embodiment, the step of defining said C comprises the following steps:

choosing a current parameter value, $X_1$, of said first access network domain, being a QoS parameter value associated with representing the radio traffic channel quality of a communication session of said UT currently communicating through said first access network domain, estimating an effective value for a corresponding QoS traffic channel quality parameter, $X_{2EST}$, for an case wherein said communication session of said UT is routed communicating through said second access network domain instead of said first access network domain, in case said UT is granted access to said second access network for performing a handover to said second access network domain, defining said C so as to grant said UT access to said second access network domain only if said estimated $X_{2EST}$ exceeds said current $X_1$.

According to this embodiment, said $X_1$ and $X_{2EST}$ may be a QoS parameter value associated with a communication session of said UT e.g. in terms of throughput, SIR or SNR.

In one embodiment, the method according to the invention further comprises the steps of:

monitoring whether said criterion C continues to be fulfilled after having instructed said A2 to grant authorization for said UT, establishing that said C is no longer fulfilled for said UT, instructing said A2 to revoke the authorization for said UT to access said second access network domain.

In one embodiment, the method according to the invention comprises the steps of:

forming a global access policy concerning at least one UT's authorization to access said second access network domain, wherein said global policy is a function of said criterion, C, monitoring radio resource parameter values relating to said second access network domain and/or said first access network domain and establishing the authorization status for at least said UT according to said global policy, detecting the change of authorization status for at least said UT, according to said global policy, forming a policy update message comprising an authorization instruction, sending said policy update message to said authorization entity application, A2, responsible for establishing whether said UT is authorized to access said second access network domain.

The authorization instruction may comprise a maximum or minimum tolerable parameter value, e.g. in terms of served UTs, associated with said second access network domain.

In one embodiment, the step of instructing said second authorization entity, A2, comprises the following step:

sending an access network domain access reply message comprising an access grant identifier indicating the authorization status of said UT based on said C and a UT identifier, to said A2 entity.

In one embodiment, said MRRM function is realized as a MRRM entity residing in a single network node wherein said RRIM message/s comprises a plurality of parameter values related to different at least one radio resource parameters, or a set of radio resource parameters, of said radio communications network and wherein said C is a function of said plurality of parameter values.

According to a second aspect, the present invention provides an authorization method to be used by an Authorization entity, A2, residing in a authorization network node being connected with a radio access network domain in a radio communications network wherein said A2 entity authorizes UTs access to said second access network domain according to a local authorization policy of said second access network domain, said method comprising the steps of:

receiving an access request from a UT to access said second access network domain, establishing whether said UT is authorized to access said second access network domain according to said local authorization policy, receiving a global authorization policy update message from a Multi Radio Resource Management entity residing in a network node of said communications network, said MRRM entity being arranged to establish a global authorization policy for a plurality of authorization domains in said communications network, said global authorization policy overriding said local authorization policy, granting said UT authorization to access to said second access network domain only if said UT is authorized to access said second access network domain according to said local authorization policy and according to said global authorization policy update message.

In one embodiment, the method comprises the steps of:

forwarding said access request to said Multi Radio Resource Management entity in said network node, receiving said global authorization policy update message in form of an access reply message from said MRRM entity, said message comprising an access grant identifier indicating whether said UT is to be granted access to said second access network domain or not, along with a UT identifier identifying said UT.

According to a third aspect, the invention provides a network node being arranged to communicate with a first access network domain in an integrated radio communications network to which domain a first authorization entity, A1, authorizes UTs access, and being arranged to communicate with a second access network domain in said communications network to which domain a second authorization entity, A2, authorizes UTs access, wherein said network node comprises means for carrying out the method according to the first aspect of the present invention.

In one embodiment, the network node comprises data storage means having stored program code means, and comprises processing means which, when said program code means is loaded into said processing means, make said processing means execute at least one procedure realizing the method according to the first aspect of the present invention.

In one embodiment, the network node is further being arranged as a Radio Network Controller, RNC, being arranged to communicate with said first access network domain via a first data port, and to communicate with said second access network domain via a second data port.

In one embodiment, the network node comprises data storage means having stored program code means, and comprising processing means which, when said program code means is loaded into said processing means, make said processing means execute at least one procedure further realizing the method according to the second aspect of the present invention.

According to a fourth aspect, the invention provides an authorization network node being arranged to communicate with a second access network domain in an integrated radio communications network to which domain a second authorization entity, A2, residing in said network node, authorizes UTs access, wherein said authorization network node comprises means for carrying out the method according to the second aspect of the present invention.

In one embodiment, the authorization network node comprises data storage means having stored program code means, and comprises processing means which, when said program code means is loaded into said processing means, make said processing means execute at least one procedure realizing the method according to the second aspect of the present invention.

In one embodiment, the authorization network node is realized as a DIAMETER or RADIUS server exploiting an EAP or an EAP-TLS or an EAP-TTLS or an EAP-PEAP protocol.

According to a fifth aspect, the invention provides a computer program product comprising program code means which, when loaded into a processing means of a network node of an integrated radio communications network wherein said network node being connected with a first access network domain to which a first authorization entity, A1, authorizes UTs access, and connected with a second access network domain, to which a second authorization entity, A2, authorizes UTs access, make said processing means execute at least one procedure realizing the method according to the first aspect of the present invention.

In one embodiment, the computer program product includes a computer readable medium, e.g. a CD-ROM, having said program code means stored thereon.

According to a sixth aspect, the invention provides a computer program product comprising program code means which, when loaded into a processing means of an authorization network node being arranged to communicate with a second access network domain in an integrated radio communications network to which domain a second authorization entity, A2, residing in said network node, authorizes UTs access, make said processing means execute at least one procedure realizing the method according to the second aspect of the present invention.

In one embodiment, the procedure of this program product exploits a RADIUS or DIAMETER protocol along with an EAP or an EAP-TLS or an EAP-TTLS or an EAP-PEAP protocol, for realizing said method.

In one embodiment, the computer program product includes a computer readable medium having said program code means stored thereon.

Even though the invention has been summarized above, the invention is defined by the accompanying claims 1-28.

BRIEF DESCRIPTION OF THE DRAWINGS

The features and advantages of the present invention will become more apparent from the following detailed description of the preferred embodiments with reference to the accompanying drawings, wherein.

DETAILED DESCRIPTION OF PREFERRED EMBODIMENTS

Now, with reference to FIG. 2-11, the present invention shall be described in more detail.

Figure 1:
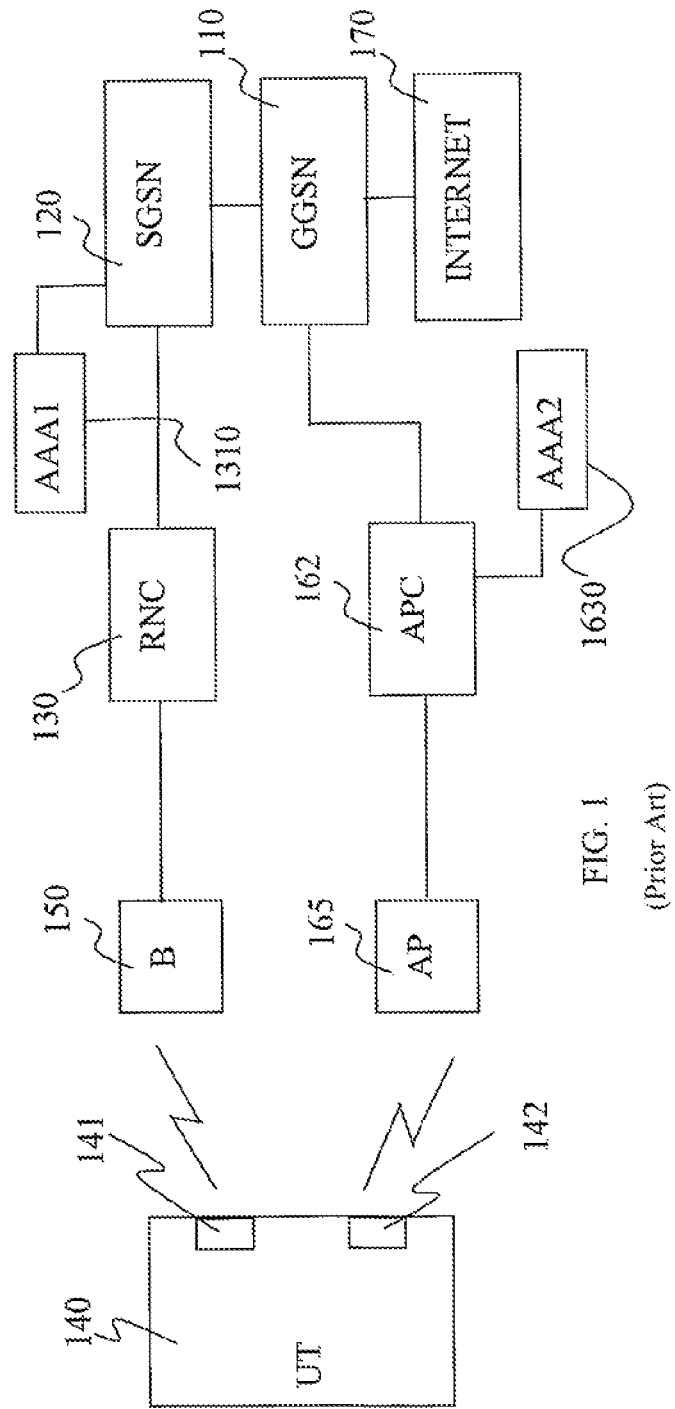
FIG. 1 illustrates a conventional integrated UTRAN-WLAN network architecture.
Figure 2:
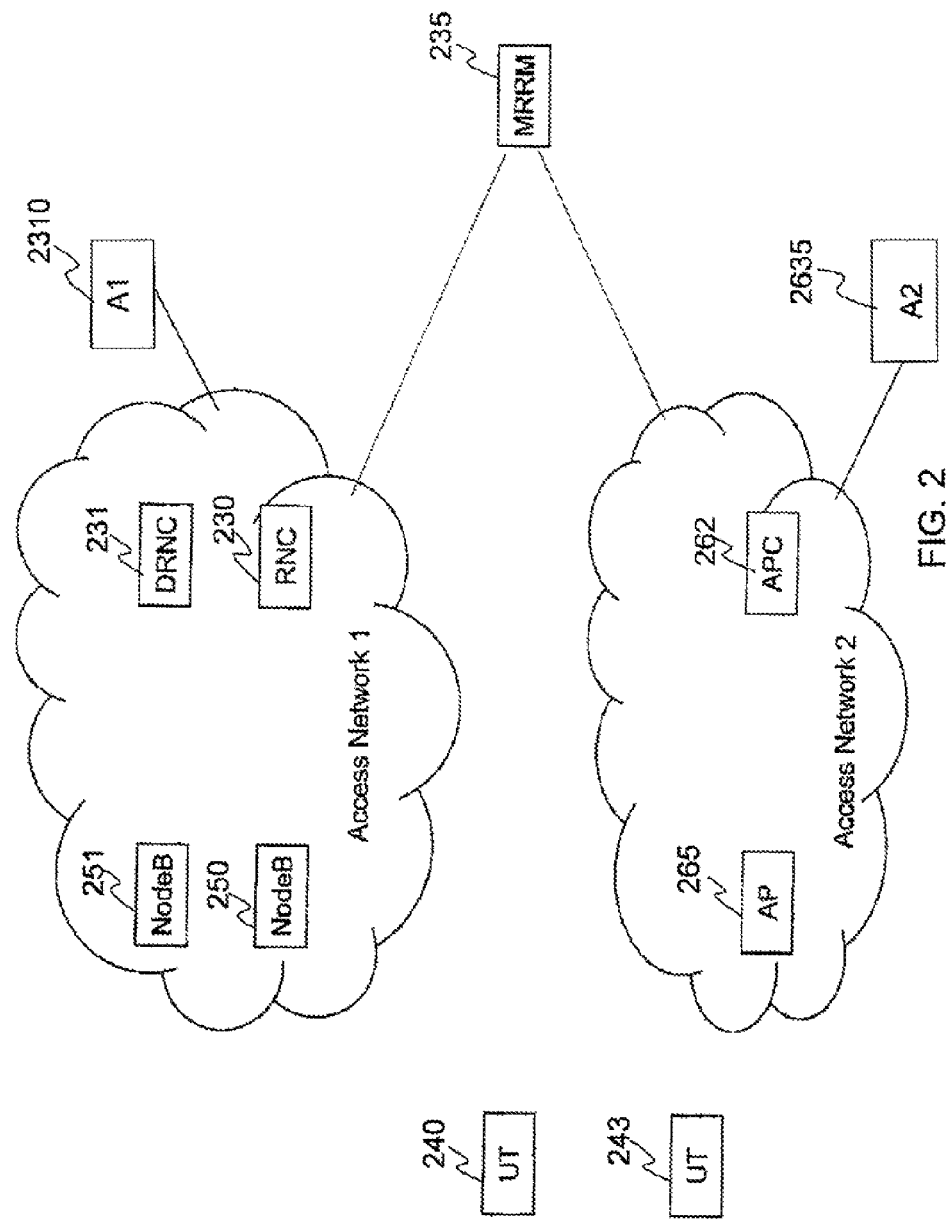
FIG. 2 illustrates a network architecture according to one embodiment of the present invention.
Figure 4:
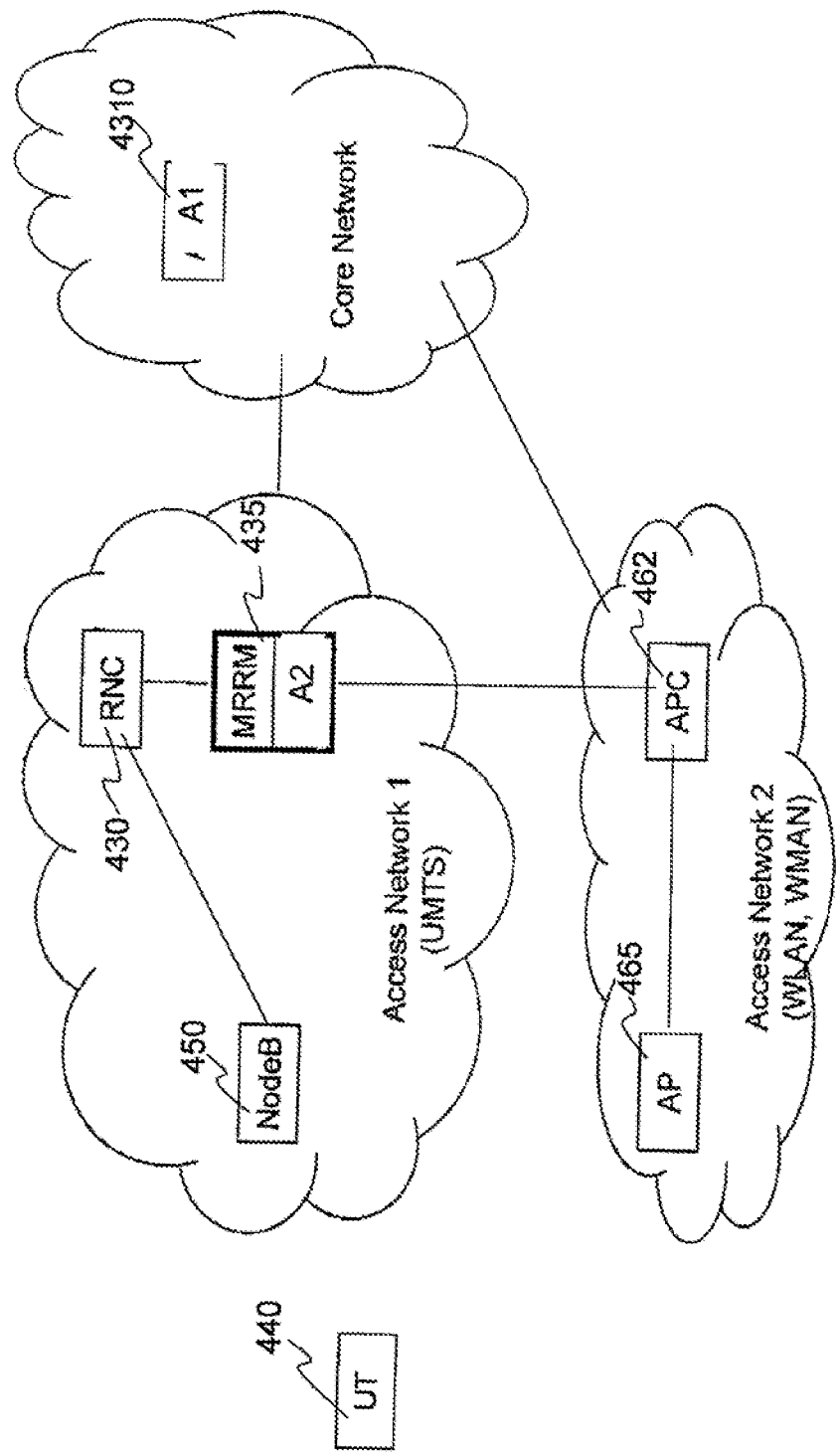
FIG. 4 illustrates a network architecture according to one embodiment of the present invention.
Figure 5:
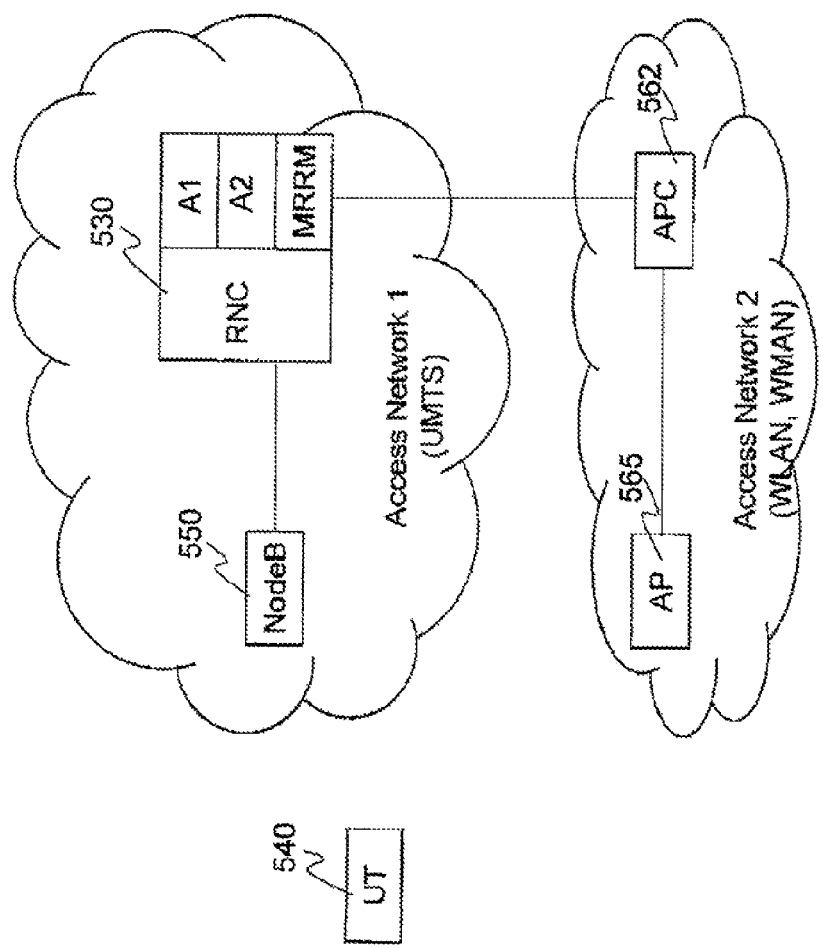
FIG. 5 illustrates a network architecture according to one embodiment of the present invention.
Figure 6:
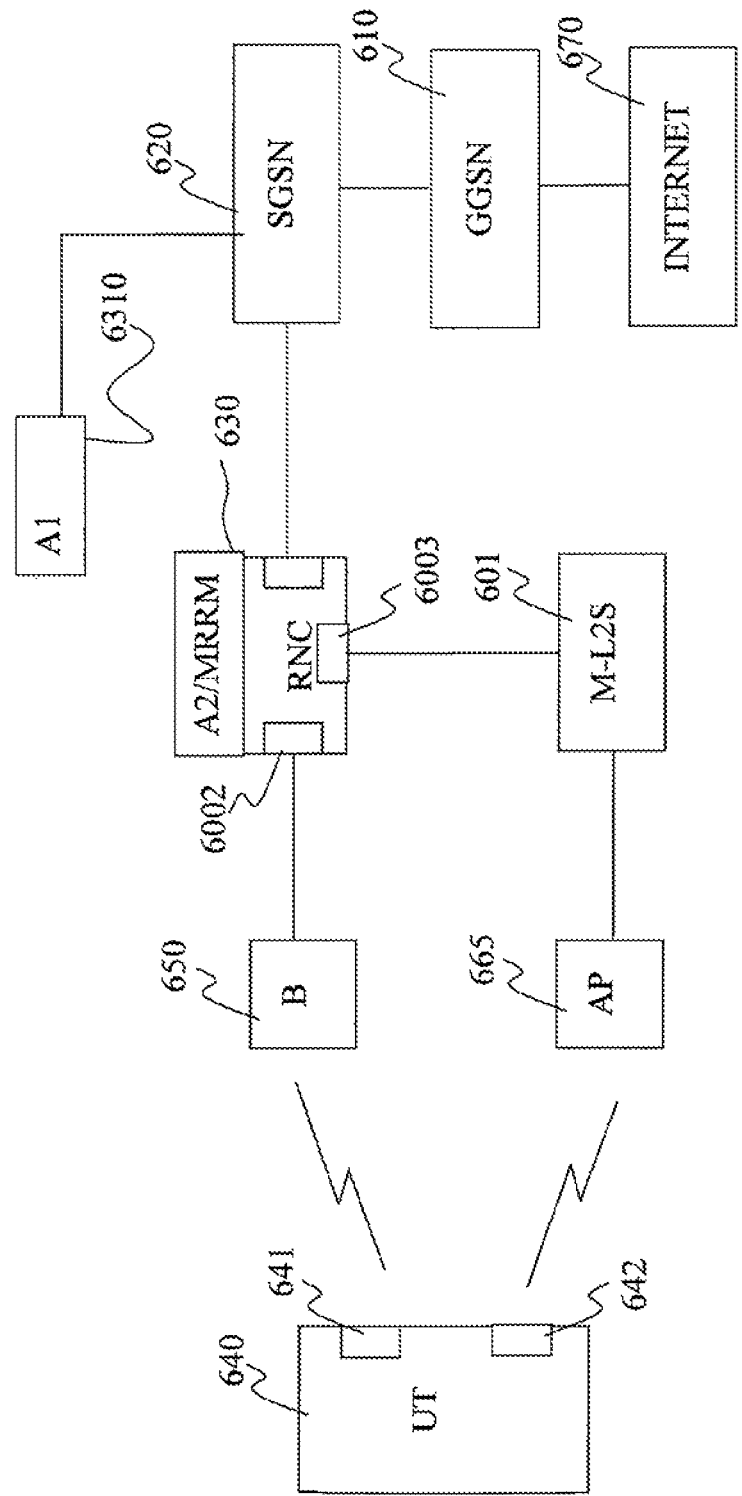
FIG. 6 illustrates an integrated UTRAN-WLAN network architecture according to one embodiment of the present invention.

In the FIGS. 1-11, corresponding elements have been given the same reference number along with a figure prefix number, e.g. the RNC 230 in FIG. 2 is referred to as RNC 630 in FIG. 6 etc.

FIG. 2 illustrates the network architecture according to one embodiment of the present invention. Access Networks 1 and 2 in FIG. 2 may be any radio access networks, e.g. two UTRANs or WLANs or one UTRAN and one WLAN. What is important according to the invention is that a first authorization entity, A1, residing in network node 2310 in FIG. 2, authorizes UTs (e.g. 240, 243) access to Access Network 1 forming a first access network domain, and that a second authorization entity, A2, authorizes UTs access to Access Network 2 forming a second access network domain. Thus, the wording "radio access network domain" shall here be interpreted as being any radio access network the access to which is controlled by a specific authorization entity responsible for authorizing UTs access to the radio access network according to a local authorization policy of said radio access network. In FIG. 2, only 2 access network domains are illustrated, but it is to be understood that the invention is applicable for any plurality of access network domains. Normally, the local authorization policy is determined by the operator administrating the access network in question. In FIG. 2, the A2 entity resides in a separate stand-alone network node, 2635, connected to Access Network 2, but the invention is not restricted hereto. Thus, Access Network 1 corresponds with a first access network domain and Access Network 2 corresponds with a second access network domain, in FIG. 2. According to the embodiment depicted in FIG. 2, an MRRM (Multi Radio Resource Management) entity resides in a first separate network node, 235, but the invention is not restricted hereto. The MRRM entity may reside in a wide range of nodes, e.g. the RNC 230 as described further below, or may be realised by means of multiple nodes together forming a distributed MRRM-functionality of the network, i.e. the MRRM-functionality is formed by a number of MRRM-entities residing in separate network nodes. The MRRM entity is arranged to receive MRRM-messages, comprising radio/(and or) network parameter values of access network 2 and optionally also from access network 1, as described further below. The MRRM entity is according to the invention further arranged to control UTs (240 and 243) access to at least the second network domain (and optionally also the access to the first access network domain), as described further below. In FIG. 2, Access Network 2 is illustrated as a WLAN comprising APC 262 and AP 265, and Access Network 1 is illustrated as a UTRAN comprising base station nodes 250, 251 (Node Bs), RNC 230 and DRNC 231, however, the invention is by no means restricted hereto, both Access Networks 1 and 2 may for instance be UTRAN networks or any other suitable radio access network, as stated above. For instance, Access Network 1 may be administrated by a first UTRAN operator, using the A1 entity for granting access to "his" network, and Access Network 2 may be administrated by a second UTRAN operator, using the A2 entity for granting access to "his" network. The network architecture according to the embodiment depicted in FIG. 2 is advantageous s since it requires only minor modifications of the access networks, i.e. the UTRAN and WLAN, in order to create an integrated access network ready to be taken in service.

Figure 3:
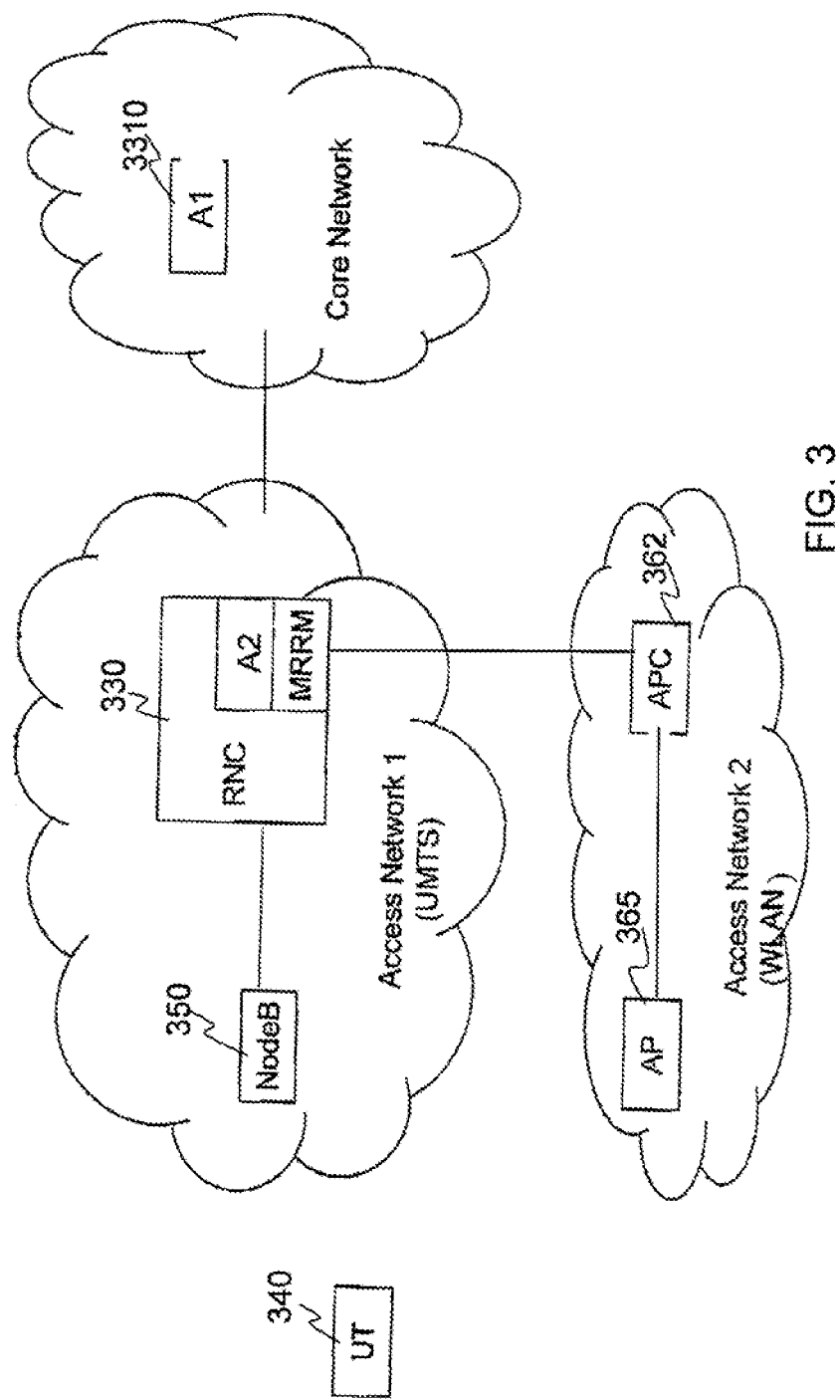
FIG. 3 illustrates a network architecture according to one embodiment of the present invention.

FIG. 3 illustrates a network architecture according to another embodiment of the present invention. In FIG. 3, the first access network domain is an UMTS network and the second access network domain is a WLAN. The UMTS radio access network normally comprises base station/s, illustrated by Node B 350, RNCs, illustrated by RNC 330. According to this embodiment, the authorization entity, A2, responsible for authorizing UTs access to the WLAN, and the MRRM entity, both reside in RNC 330 of the UMTS network. The authorization entity A1 normally resides in a separate network node 3310 of the UMTS core network, and may be the conventional authorization entity described above with reference to FIG. 1, i.e. forming part of a conventional 3GPP AAA entity. The WLAN comprises APs, illustrated by AP 365, and APCs, illustrated by APC 362, in FIG. 3. Advantegously, the APC 362 is connected to the RNC 330, allowing efficient handover schemes since the MRRM entity of RNC 230 then may function as an "enhanced" conventional 3GPP RRM entity, residing in the "right" node having access to RRM information from both the WLAN and the UTRAN, as described further below. The UT 340 may be a dual mode UT capable of communicating through the UMTS network and the WLAN, i.e. capable of establishing a data session through the WLAN and the UMTS-UTRAN. Thus, the network architecture according to the embodiment depicted in FIG. 3 has the advantage of positioning the MRRM entity in the conventional UTRAN RRM node, i.e. the RNC 330, and provides a possibility to realize an efficient "enhanced" UTRAN RRM functionality in a convenient manner, since the RNC 330 has convenient access to all the conventional RRM UTRAN information. Furthermore, placing the A2 entity in the same node as the MRRM entity gives advantages of decreased network signaling, network access delays etc., as a person skilled in the art understands when reading the description of the method according to the invention described below, i.e. the described functionality of the MRRM entity and the A2 entity. The A2 entity may be a modified Authorization entity of the conventional WLAN AAA entity depicted in FIG. 1. It is obvious for a person skilled in the art how to realize such an MRRM entity and A2 entity when reading the description of the functionality of the MRRM entity and the A2 entity, described below.

FIG. 4 illustrates another possible network architecture according to one embodiment of the invention. The MRRM entity and A2 entity here resides in the same network node, 435, which may be e.g. a RADIUS or DIAMETER server connected to the RNC 430 and APC 462, allowing the MRRM entity and A2 entity to communicate with the UTRAN access network 1 and WLAN access network 2 in FIG. 4. The other network nodes/elements in FIG. 4, i.e. the A1 entity 4310, the UT 440, the Node B 450 and the AP 465 are illustrated to better understand the invention. The RNC 430 could be integrated with Node B 450 and APC 462 could be integrated with AP 465. An advantage with the network architecture depicted in FIG. 4 is that network node 435 only handles control plane functions and signaling which may be desirable for obtaining a network with a distinct division between user plane data processing and control plane data processing.

FIG. 5 illustrates still another possible network architecture according to one embodiment of the invention. The MRRM entity, A1 entity and A2 entity here resides in the RNC 530. The other network nodes/elements in FIG. 5, i.e. the APC 562, the UT 540, the Node B 550 and the AP 565 are illustrated to better understand the invention. An advantage with the network architecture depicted in FIG. 5 is that it provides a cost efficient alternative requiring only minor modifications of the access networks in order to provide an integrated network ready to take in service.

Referring now to FIG. 6, the present invention will here be described for the specific case wherein the first access network domain is a 3GPP UTRAN and the second alternative access network domain is a WLAN, i.e. in accordance with the IEEE 802.11 standard, wherein the MRRM entity and the A2 entity reside in the RNC 630. It is to be understood that this is only an illustrative example and that the invention is applicable for the integration of any radio access networks, e.g. any cellular radio networks such as GSM cellular radio networks, IS-95 cellular radio networks etc and any Layer 2 Radio Networks (L2-RN), e.g. in accordance with the IEEE 802 standard protocol family, such as Wireless Personal Area Networks (WPAN, IEEE 802.15), Wireless Metropolitan Area Networks (WMAN, IEEE 802.16), Mobile Broadband Wireless Access (MBWA, IEEE 802.20), Wireless Regional Area Networks (WAAN, IEEE 802.22) etc. Furthermore, as an illustrative example, the UTRAN is connected to the Internet 670 via an intermediate UMTS (Universal Mobile Terrestrial System) network, comprising e.g. the SGSN 620, the GGSN 610. What is important according to the invention is that the first access network constitutes a first access network domain and that the second, alternative, access network constitutes a second network domain, as explained above. The WLAN's conventional layer 2 Ethernet switches (APCs) are hereafter referred to as M-L2Ss (Multicast-enabled Layer 2 Switches). Since the Ethernet (IEEE 802.3) protocol is used for most of the WLAN's layer 2 protocols to communicate with fixed network infrastructure, an M-L2S is identical with an Ethernet switch. In FIG. 6, the RNC 630 is connected with the M-L2S 601, and the M-L2S 601 is connected to the Access Point, AP, 665, however, many possibilities exist. A plurality of APs may e.g. be connected directly to the RNC 630 or to a plurality of intermediate M-L2Ss connected to the RNC 630. There may be several M-L2Ss in the transmission path between an AP and an M-L2S. Normally, in order to facilitate distributing or multicasting layer 2 messages within the WLAN, the RNC 630 is connected to the WLAN through one single M-L2S. The RNC 630 is connected to the SGSN 620 through a separate RNC data port, and with the Node B 650 through the RNC data port 6002. The RNC 630 is further connected with the M-L2S 601 through the RNC data port 6003. The RNC 630 has an installed authentication application entity, A2, responsible for authenticating UTs requesting access to the wireless data network, i.e. establishing whether a UT is authorized to access the WLAN according to a local authorization policy. The A2 entity and its functionality is further described below. The RNC 230 is further arranged to communicate with the conventional 3GPP authentication entity, A1, which may be the authentication entity of the 3GPP AAA entity illustrated in FIG. 1 and installed in the network node 6310. The AP 665 is connected with the M-L2S 601. In a conventional manner, specific applications or protocols may share a common physical data port, defined by a MAC (Media Access Control) protocol layer. Normally however, the data ports 6002 and 6003 are associated with physically separated contacts, e.g. data port 6002 is associated e.g. with a separate Ethernet contact. The RNC 630, port 6002 of RNC 630, base station node B 650 define a first access network domain and a first transmission path, for routing a data session, such as a PDP context session, to/from the UT 640 via its data port 641. The RNC 630, port 6003 of RNC 630, M-L2S 601 and the AP 665, define an alternative access network domain and an alternative transmission path, for routing a data session, such as a PDP context session, to/from UT 640 via its port 642. There may be intermediate Access router/s and an Internet network connected between the M-L2S 601 and the RNC 630, exploiting the TCP/UDP/IP-protocol, not illustrated in FIG. 6.

The functionality, e.g. regarding routing, radio resource management etc., of e.g. the UT 640, the RNC 630, the M-L2S 601 and the AP 665 in FIG. 6 is normally realized by protocol stacks and software applications loaded in processing means, e.g. CPUs at the UT 640, the RNC 630, the M-L2S 601, the Node B 650 and the AP 665.

Figure 7:
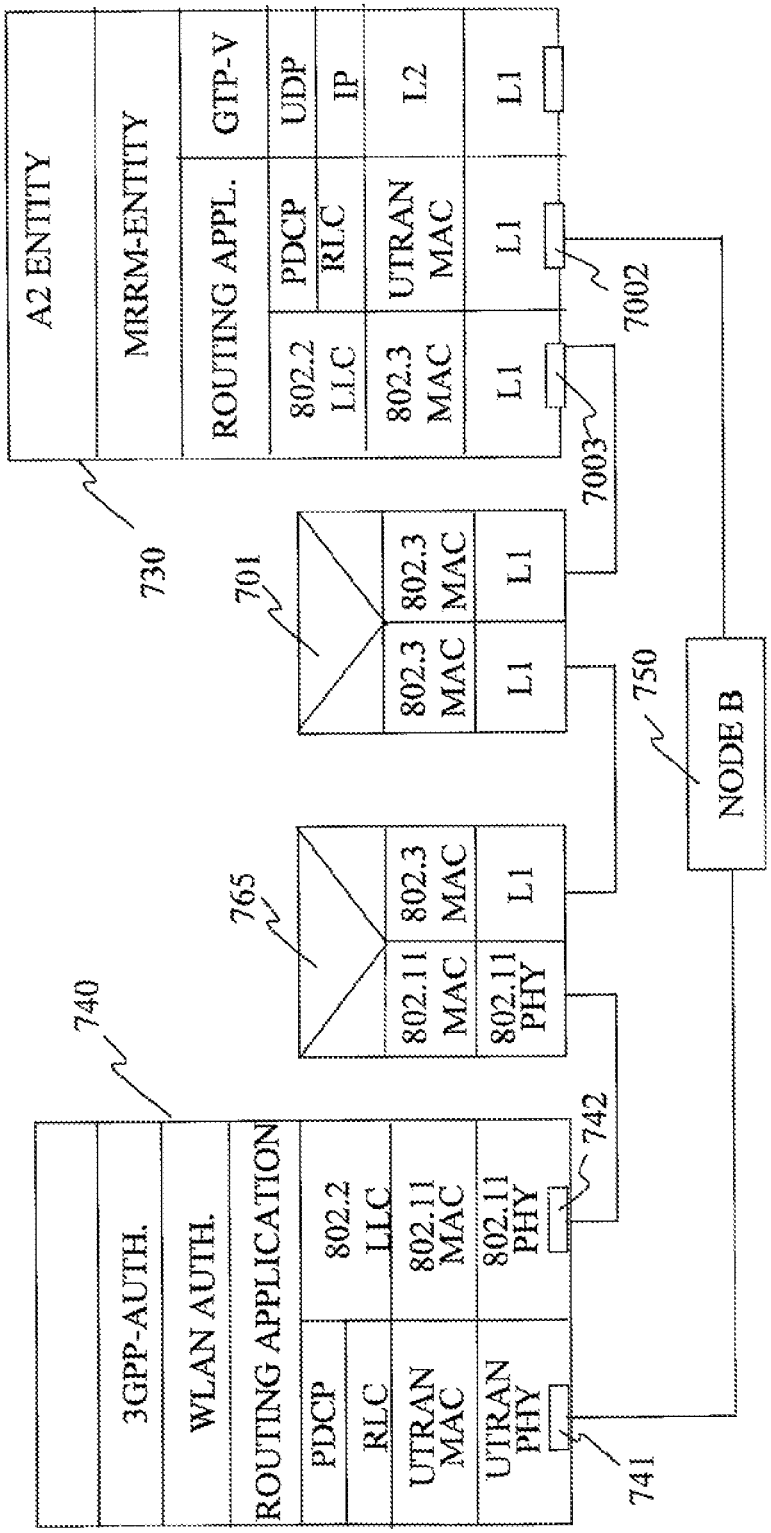
FIG. 7 illustrates an example of the protocol stacks and software applications of the network illustrated in FIG. 6.

FIG. 7 illustrates an example of parts of the protocol stacks and applications which according to the embodiment of the invention illustrated in FIG. 6 are installed at the RNC 630, the M-L2S 601, the AP 665 and the UT 640 in FIG. 6. In FIG. 7, the RNC 730 has a conventional UTRAN protocol stack installed, comprising UTRAN MAC (Media Access Control) protocol, defining data port 7002, RLC (Radio Link Control) protocol, PDCP (Packet Data Convergence Protocol), GTP-U (GPRS Tunnelling Protocol—User plane) protocol, UDP (User Datagram Protocol) and IP (Internet Protocol). According to the invention, the RNC 730 further has an Ethernet- and WLAN-protocol stack installed associated with data port 7003, i.e. the IEEE 802.3 MAC protocol, defining data port 7003, and the IEEE 802.2 LLC (Link Layer Control) Ethernet protocol stack. The RNC 730 has further a conventional 3GPP RLC-layer. The conventional "WLAN-part", i.e. the M-L2S 701 and the AP 765 have conventional physical layers and IEEE 802.3 & 802.11 MAC protocol layers installed. The UT 740 has a conventional UTRAN protocol, comprising a UTRAN physical layer, MAC layer, defining data port 741, RLC layer and PDCP layer. The UT 740 has also a conventional 3GPP authentication application entity and a conventional WLAN authentication entity, allowing the UT 740 to prove its authorization to access the UTRAN and the WLAN by communicating with the A1 entity and A2 entity, respectively, in a conventional manner. UT 740 has further an IP protocol, a UDP/TCP and higher application protocol layers installed, not illustrated in FIG. 7, for Internet communication session purposes. The UT 340 has also an Ethernet- and WLAN-protocol stack installed, i.e. an IEEE 802.11 physical layer, MAC layer, defining data port 742, and 802.2 LLC layer. The UT 740 has a Routing application installed "on top" of the LLC/PDCP/MAC layers, for routing a data session via port 741 or 742. The UT 740 has further a conventional 3GPP RLC-layer and a conventional 802.2 LLC-layer. The RNC 730 has a Routing application and, and a MRRM (Multi Radio Resource Management) application, installed "on top" of the LLC/PDCP/MAC layers. The routing application of UT 740 and RNC 730 routes a data session between the UT 740 and an Internet host via the WLAN and/or UTRAN path, but will not be described further here. The MRRM entity of the RNC 730 collects radio resource information from at least the WLAN, and advantageously also from the UTRAN, e.g. by receiving conventional radio resource information messages, RRIMs, as described further below. According to the invention, the MRRM entity controls the access to at least the WLAN based on said radio resource information, as explained further below. The lower protocol layers allow the UT 740 and RNC 730 to establish logical data connections for exchanging RRIM information, by conventional protocol layer processing, as a person skilled in the art realizes. For instance, the MAC layer filters out packets intended for the physical device, the LLC layer forwards the packets to the "right" layer/application which in turn may forward the packet further up to a specific layer/application until it is received by the "right" application.

Figure 8:
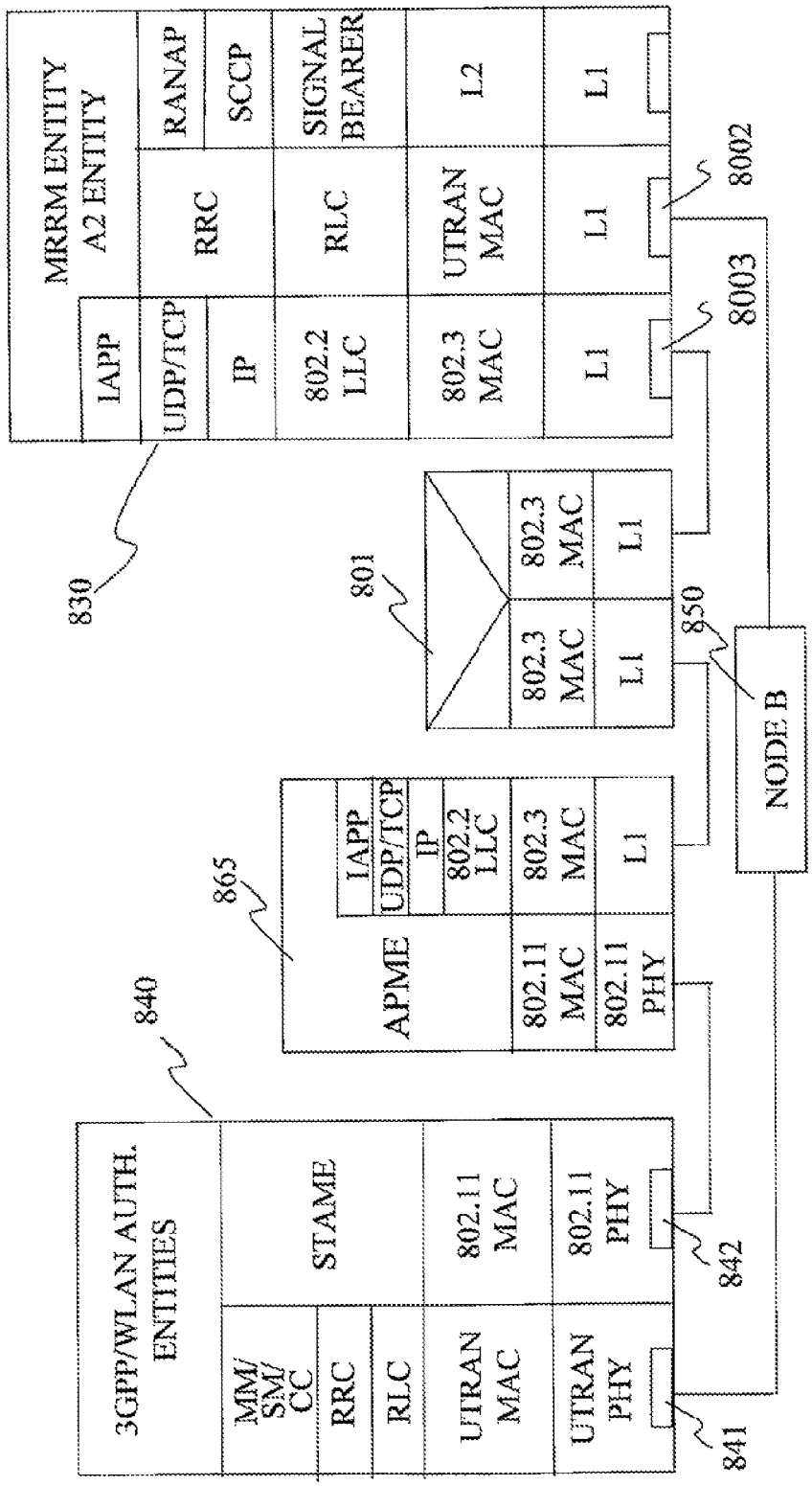
FIG. 8 illustrates an example of the control plane protocol stacks and software applications of the network illustrated in FIG. 6.

FIG. 8 illustrates an example of further control plane protocol stacks/applications at the RNC 630, the M-L2S 601, the AP 665 and the UT 640 in FIG. 6. More specifically, FIG. 8 illustrates the protocols/applications that the MRRM entity of RNC 830 exploits in order to receive RRIM messages. RRIM messages may e.g. be any conventional 3GPP RRIM-messages such as e.g. a Congestion Control message, a Load Control message, an Admission Control message, an MM (Mobility Management) message, a SM (Session Management) Message, a CC (Call Control) message or e.g. any conventional WLAN RRIM messages, but the invention is by no means restricted to "standard" RRIM-messages. What is important according to the invention is that the RRIM-messages comprises at least one radio resource parameter value as explained further below.

In FIG. 8, a conventional IAPP (Inter Access Point Protocol) is installed on top of the 802.2 layer at AP 865 and the UDP/TCP layer at RNC 830, along with the conventional APME (Access Point Management Entity) application at AP 865 and a conventional STAME (Station Management Entity) application at UT 840, allow the MRRM entity of RNC 830 to receive WLAN-RRIM messages, as a person skilled in the art realizes. The conventional UTRAN control protocol stack, comprising e.g. the RRC layer illustrated in FIG. 8, allow the MRRM entity of RNC 830 to receive 3GPP-RRIM messages. However, any protocol for exchanging RRIM messages between a network (access) node and a network control node may be used instead, as a person skilled in the art realizes, e.g. a LWAPP, (Light Weight Access Point Protocol), not illustrated in FIG. 8, could be used instead of the IAPP. Many possibilities obvious for a person skilled in the art exist.

For authentication and communication purposes, the A2 entity of RNC 830 and the WLAN authentication application of UT 840 may e.g. exploit a conventional RADIUS protocol, as specified by the documents RFC 3579 (RADIUS support for EAP), RFC 2865, RFC 2869 (RADIUS Extensions), RFC 3576 (Dynamic Authorization Extensions to RADIUS) and RFC 3580 (IEEE 802.1X RADIUS Usage Guidelenes) or a DIAMETER protocol, as specified by RFC 3588 (DIAMETER Base Protocol), along with a conventional EAP (Extensible Authentication Protocol), e.g. as defined by standard AAA-(Authenticating, Authorization, Accounting) protocols RFC 2284-PPP EAP, RFC 4017 (EAP requirements for WLAN) or RFC 3748 (EAP) or RFC 2716 (PPP EAP TLS) or the EAP-TTLS (EAP Tunneled TLS Authentication Protocol), issued by the IETF standard organisation (Internet Engineering Task Force) and may further exploit the EAP-PEAP (Protected EAP Protocol), as a person skilled in the art realises.

According to the embodiment illustrated in FIG. 6, it is important that the MRRM entity is installed in a network node connected to both the UTRAN and WLAN allowing the MRRM entity to receive RRIM messages from both the UTRAN and the WLAN, and that the A2 entity is installed in a network node connected to the WLAN allowing the A2 entity to receive a WLAN access request from a UT 240, and that the MRRM entity and A2 entity can communicate with each other by means of some suitable protocol, which may be e.g. a IEEE 802 protocol, a 3GPP protocol or a UDP/

TCP/IP protocol, as a person skilled in the art realises. The functionality of the MRRM entity basically comprises:

receiving RRIM information as described above, deciding on access policies of said integrated UTRAN/WLAN based on at least said RRIM information related to the WLAN, instructing said A2 entity and A1 entity regarding their authorization policies accordingly.

The A2 entity may be realized by modifying the conventional AAA2 entity in FIG. 1, by giving the conventional AAA2 entity the functionality described below. The A2 entity may for instance be realized by means of conventional RADIUS or DIAMETER protocols, along with e.g. conventional EAP, EAP-TLS, EAP-TTLS, or EAP-PEAP authentication protocols. A person skilled in the art realizes how to modify e.g. a RADIUS-EAP-AAA server so as to realize the A2 entity described below.

According to the invention, an RRIM message comprises a measured value of at least one of the following radio resource parameters:

a parameter measured per user/session basis, for instance:

a radio link quality parameter, (measured by, and signaled to the MRRM entity from, e.g. UT 640 or AP 665 or BS 650, in terms of signal to noise/interference ratio (SNR, SIR), bit/frame error rate (BER, FER), throughput (Kb/s), packet delay (s), an achievable data rate parameter (calculated/signaled by/from UT 640 or AP 665 or BS 650, or RNC 630, on a per user/session basis, in terms of throughput (Kb/s), a radio link usage cost parameter, e.g. as an economical measure, e.g. US-dollar/cents/min or transmission power (W), or number of available/free/used codes, time slots, carriers etc.

a UT resource information parameter (stored/signaled at/from UT 640, in terms of terminal capability/limitations, e.g. memory size (Kb), processor capacity (flops), battery level (Ah), a buffer size parameter (stored/signaled at/from UT 640, AP 665, Node B 650, RNC 630, (in terms of e.g. Kb)), a service requirement parameter (stored/signaled at/from UT 640, RNC 630, AP 665, in terms of rate (Kb/s), QoS (Kb/s, delay(s), bit/frame error rate), and/or as a mobility requirement parameter, along with a relevant access point identifier or cell identifier, and/or as a security requirement parameter (e.g. in terms of required security key length or authentication requirement settings or any security settings parameter), and/or as an acceptable packet delay requirement (e.g. in ms), and/or as a jitter requirement.

a system information parameter, measured per cell, per AP/Node B or groups of APs/Node Bs, stored/signaled at/from AP 665, M-L2S 601 (Access Router), Node B 650 or RNC 630, for instance cell configuration parameter (frequency (Hz, channel nr), maximum transmission power (W)), available/used/free system resource parameter (max tx power (W), the number of available/used/free time slots, transmission codes, available/used/free frequencies (Hz, channel nr), processing resources (flops), cell capacity parameter (maximum/minimum throughput (Kb/s)

number of maximum supported users parameter (Nr), transmission capability parameter (e.g. guaranteed rate (Kb/s), mobility support parameter (e.g. acceptable packet delay, packet loss, packet re-ordering, for handover), security support setting parameter (e.g. ciphering/authorization requirements, ciphering key length), neighbor id parameter (AP/cell identity number for neighboring APs/cells), which may also be stored/signaled at/from UT 640.

A RRIM message may e.g. be any of above mentioned standard "RRIM" messages or any signaling message comprising any of above parameter/s, or a session identifier such as an IP-flow identifier defining for instance a streaming session or a VoIP-session (Voice over IP) or web-data session, optionally along with a suitable identifier identifying e.g. the UT 640, (e.g. comprising its USIM nr and/or WLAN-MAC-address), the AP 665 or Base station Node B 650 (comprising a conventional access point identifier or conventional cell identifier).

Figure 9:
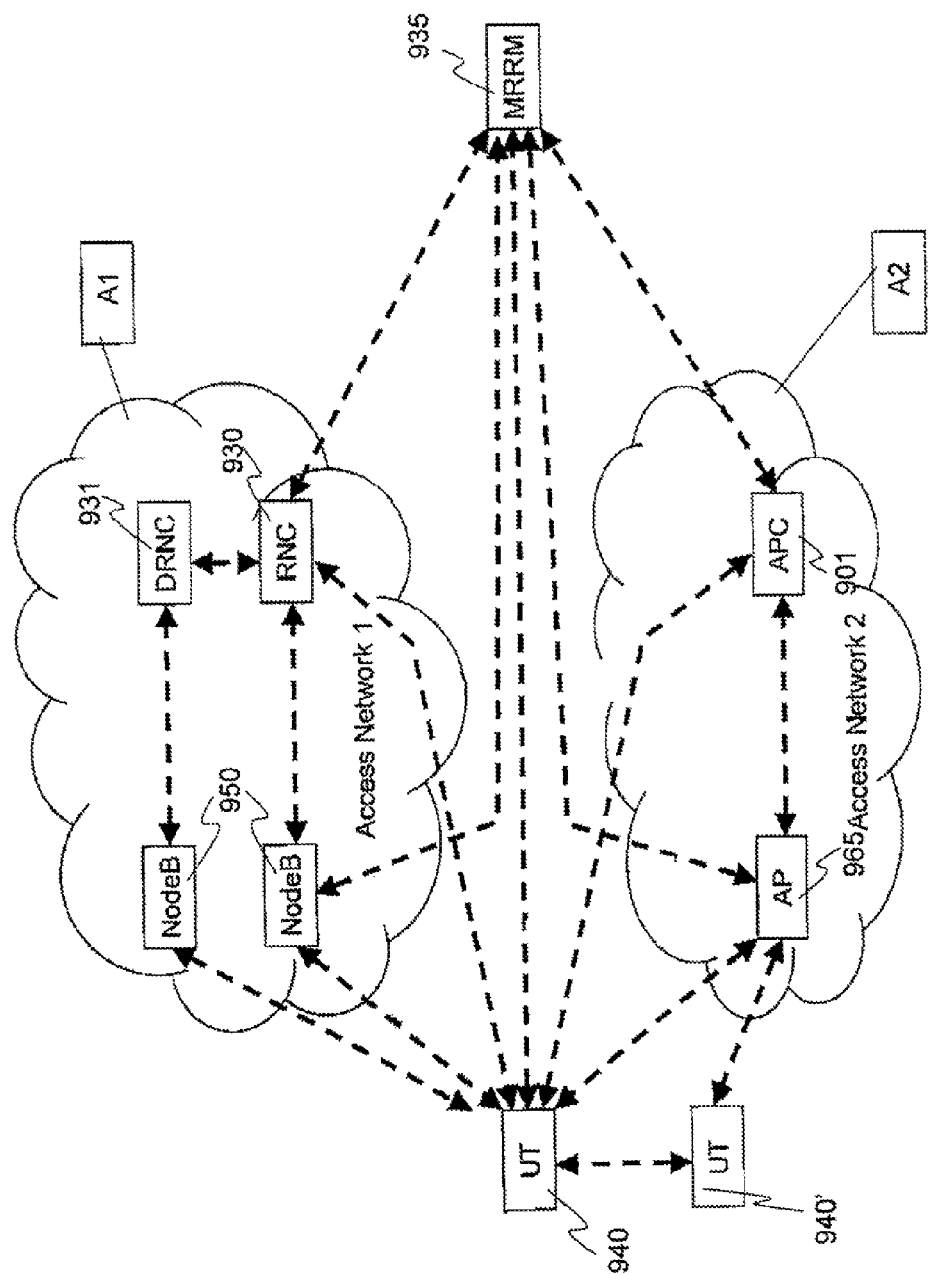
FIG. 9 illustrates an illustrative example of various communication paths for communicating RRIM messages according to the present invention.

FIG. 9 illustrates, as an illustrative example, various communication paths for communicating RRIM messages according to the present invention. In FIG. 9, the RRIM messages may be signaled in the following manner between AP 965 and APC 901 (alt. M-L2Ss or Access Router/s); e.g. by means of the conventional IAPP along with the underlying IEEE 802 protocol, as illustrated in FIG. 8, or exploiting a conventional LWAPP along with underlying conventional IETF protocol, between Node B 950 and RNC 930 (or DRNC 931, Drift Radio Network Controller); e.g. by means of conventional NBAP (Node B Application Part) along with 3GPP RRC protocol, between Node B 950 and UT 940; e.g. by means of conventional 3GPP control message signaling, between AP 965 and UT 940; e.g. by means of conventional IEEE 802.11k control message signaling, between RNC 930 and UT 940; e.g. by means of 3GPP RRC control message signaling over the UTRAN path, between RNC 930 and UT 940; e.g. by means of the conventional MAC and LAPP protocols described above, over the WLAN path, between RNC 930 and MRRM entity in network node 935 (e.g. in case MRRM is not installed in RNC 630); e.g. by means of a UDP/TCP/IP protocol.

between APC 901 and MRRM entity in network node 935 (e.g. in case MRRM is not installed in RNC 630); e.g. by means of a UDP/TCP/IP protocol.

between Node B 950 and MRRM entity in network node 935 (e.g. in case MRRM is not installed in RNC 630); e.g. by means of a 3GPP UTRAN protocol.

between AP 965 and MRRM entity in network node 935 (e.g. in case MRRM is not installed in RNC 630); e.g. by means of a IAPP, UDP/TCP-IP, along with lower IEEE 802 layers as illustrated between RNC 830 and AP 865 in FIG. 8.

In case the MRRM-entity is integrated in a specific network node, e.g. RNC 930, then the conventional protocols used for signalling with said node may be used to signal the RRIM-messages according to the present invention, e.g. the 3GPP UTRAN protocol may be used in case the MRRM-entity resides in RNC-node 930. A person skilled in the art realizes how the RRIM signaling is carried out by means of above indicated protocols.

In case the MRRM entity and A2 entity are co-located in the same network node, any of above radio resource parameters may be included, along with a suitable identifier (e.g. a session identifier and/or an identifier identifying e.g. the UT 640, AP,665 or Node B 650), in RADIUS/DIAMETER messages.

Now, with reference to FIGS. 10A-B and 11A-B, the method according to the invention shall be described in detail, for the case of the network architecture depicted in FIG. 6, as an illustrative example.

Figure 10A:
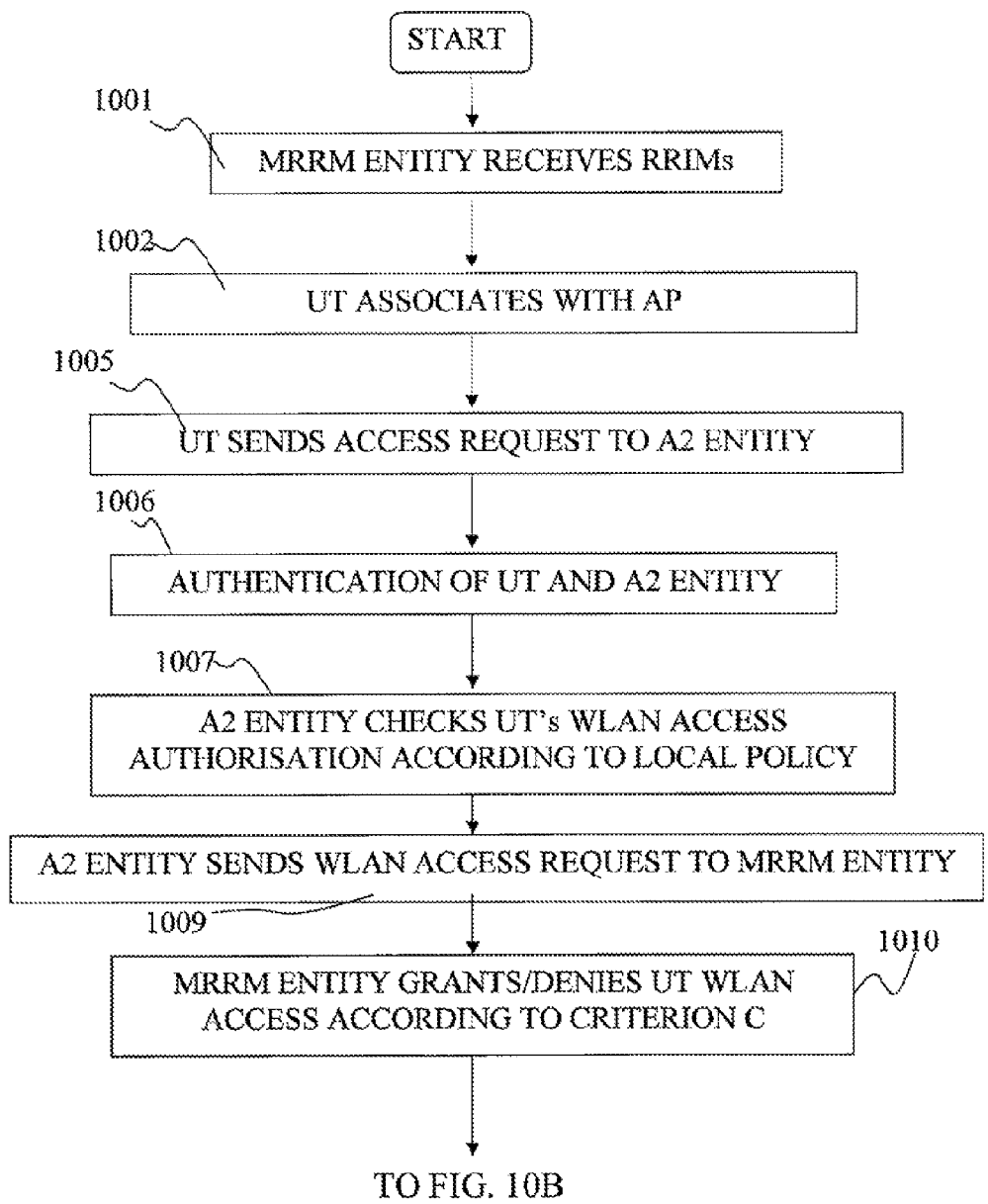
FIG. 10A-B illustrate a flow chart for the method according to the present invention.

In step 1001 in FIG. 10A, the MRRM entity described above receives RRIMs, as described above, each comprising at least one of above described parameters, optionally along with a suitable identifier, as discussed above.

In step 1002, a UT 640 associates with the AP 665 and a conventional AAA (Authorisation, Authentication, Accounting) procedure is triggered, e.g. according to the EAP protocol and RADIUS/DIAMETER protocol. The AP 665 further establish the identity of UT 640. This step is illustrated by action 1 and 2 in FIG. 11A.

Figure 11A:
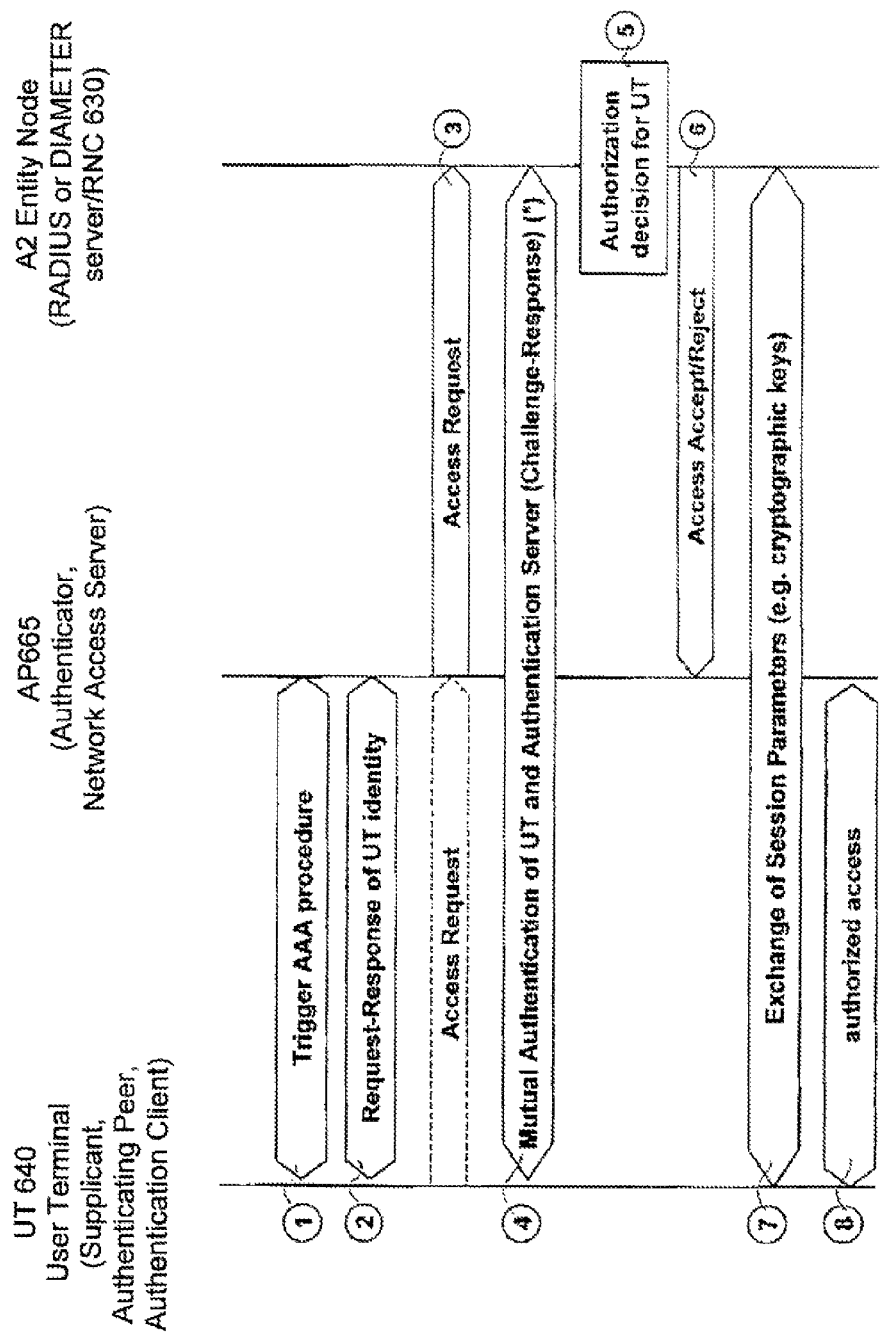
FIG. 11A-B illustrate a signaling diagram for some of the steps illustrated in FIG. 10A-B.
Figure 11B:
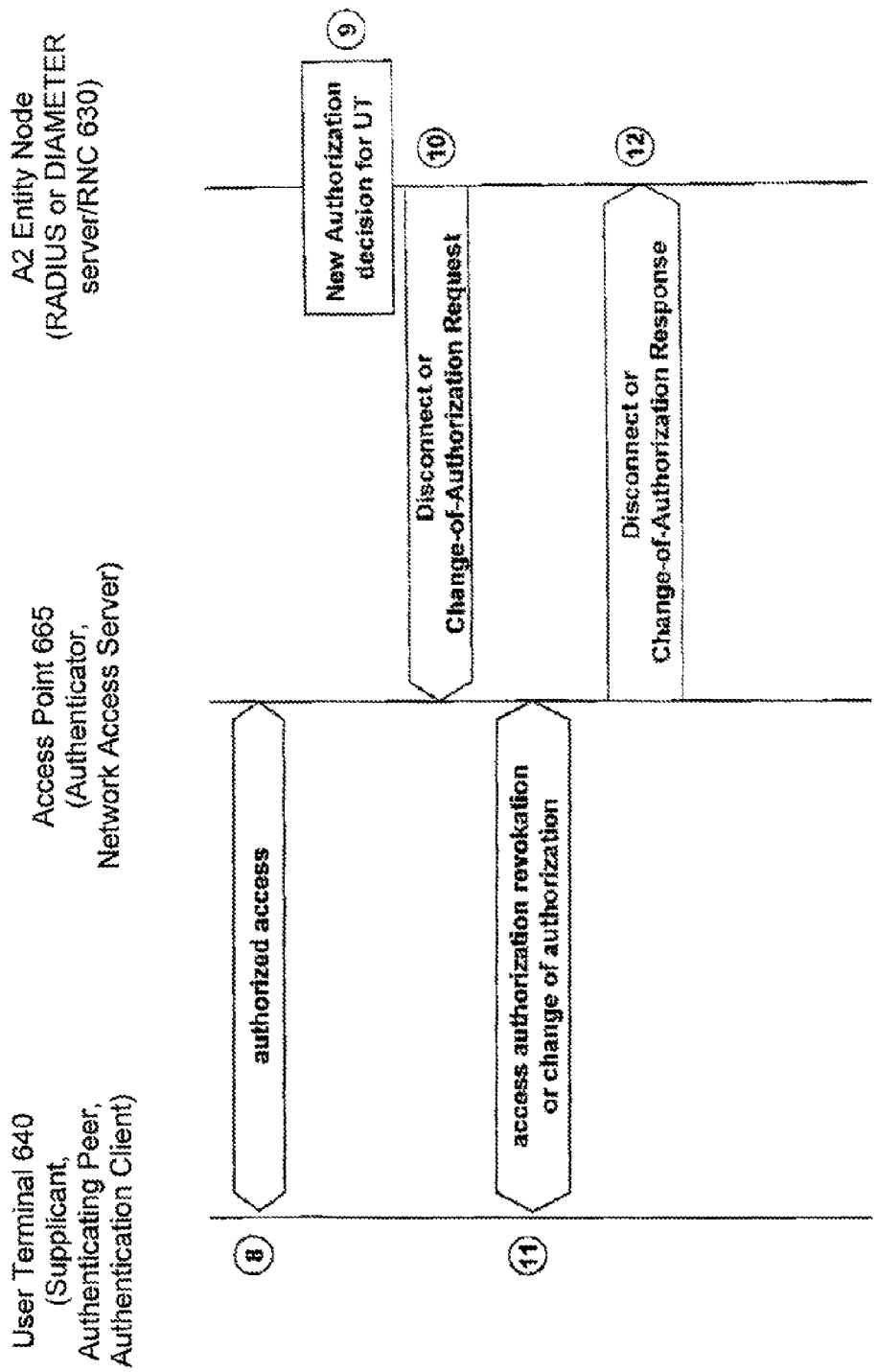

In step 1005, the UT 640 sends a conventional WLAN access request to the local A2 entity, e.g. installed in RNC 630, as illustrated by action 3 in FIG. 11A.

In step 1006, the UT 640 and A2 performs a conventional mutual authentication investigation, e.g. by means of a standard challenge-response authentication protocol (e.g. EAP), wherein the true identities of UT 640 and A2 entity are established. The authentication may in a conventional manner be based on credentials like digital certificates, user-names and passwords, existing secure tokens, mobile network credentials (GSM and UMTS secrets), public/private keys (without necessarily requiring a certificate) and assymetric credential support (e.g. password on one side, public/private key on the other). This step is illustrated by action 4 in FIG. 11A.

In step 1007, the A2 entity checks whether UT 640 is authorized to access the WLAN, according to a local authorization policy of A2 entity, e.g. by retrieving the authorization status of UT 640 from a database look-up table list comprising the identities of all authorized UTs according to a local WLAN-policy wherein said look-up table normally is a fix identity list pre-installed by an operator. If the UT 640 is found to be authorized according to said local policy, i.e. its identity was found in the look-up table, the method proceeds to step 1009, otherwise it proceeds to step 1018. The A2 entity's local authorization policy forms a prerequisite condition for granting UT 640 access to the WLAN.

In step 1009, the A2 entity forms a WLAN access request for UT 640 to access the WLAN and forwards it to the MRRM entity, residing e.g. in the RNC 630. In one embodiment, the A2 entity and MRRM entity reside in the same network node, e.g. the RNC 630, and the request is forwarded to the MRRM-entity by means of a local communications process obvious for a person skilled in the art. In an alternative embodiment the A2 entity and MRRM entity resides in different network nodes wherein the request may be forwarded to the MRRM entity for instance by means of above described IEEE 802 protocol or a UDP/TCP/IP protocol. The WLAN access request normally comprises a UT identifier field, e.g. comprising a WLAN address of UT 640 or its (cellular radio network) SIM-card number, and a WLAN access request identifier field wherein e.g. a one bit "1" may represent a WLAN request.

In step 1010, the MMRM application establishes whether UT 640 shall be granted access to said WLAN according to a global access policy by checking whether a WLAN access criterion, C, is fulfilled or not for said UT 640. According to the invention, said criterion is a function of at least a parameter value, $X_W$, of a radio resource parameter $P_W$ related to the WLAN, among above described radio resource parameters. It shall be stressed that the access criterion, C, may depend on a plurality of various parameter values, associated with a single specific radio resource parameter and/or a plurality of different radio resource parameters. For instance, the criterion, C, may be defined so as to allow a UT network access only if the available free throughput capacity (Kb/s), associated with a specific access point, exceeds a threshold value and at the same time the security service parameter (e.g. in terms of available security key bit length), associated with said access point exceeds a security parameter requirement of said UT, and many further possibilities exist. According to the invention, the global access policy considers the status of the radio resources of at least the WLAN, and optionally also the cellular radio network, for granting a UT 640 access to the WLAN. The global access policy of the MRRM entity forms an additional condition for the local authorization policy of A2 entity to treat a UT 640, requesting access to the WLAN, as actually being authorized to access the WLAN. Thus, according to the invention, the A2 entity treats a locally authorized UT 640, i.e. its identity is present in the operator's pre-installed look-up table descried above, as actually authorised to access the WLAN only if the UT 640 is granted access according to the global access policy of the MRRM entity. The MRRM entity continuously, or at regular intervals, receives (e.g. as a response on transmitted dedicated RRIM request messages) RRIMs from the WLAN and UTRAN.

In one embodiment, said criterion C of the MRRM entity is further a function of at least a parameter value, $X_C$, of a radio resource parameter $P_C$ related to the UTRAN, among above described radio resource parameters. The $X_C$ may represent a total traffic load in terms of e.g. throughput (Kb/s) or total number of users (UTs) associated with said cellular radio network or a specific radio base station (650) of said cellular radio network, or alternatively said $X_C$ may represent the radio channel quality of said UT (640) in terms of a signal to noise/interference ratio (SNR, SIR) or QoS as a measured bit/frame error rate (BER, FER), packet delay (s) or throughput (Kb/s). The throughput value for the network, or access node/s (e.g. Node B 650 or AP 665) may or alternatively be a percentage value of the total maximum throughput capacity of the network, or access node/s. The channel quality of UT 640 is preferably measured and signalled to the MRRM entity continuously at regular intervals, or triggered by a parameter value exceeding/falling below a specific threshold value, on a per session basis.

In one embodiment, said criterion C is defined in the following way defining a maximum tolerable threshold value, $X_{WMAX}$, for said radio resource parameter $P_W$, estimating the effective value, $X_{WEST}$, of said parameter $P_W$ as a consequence of said UT being granted access to said wireless data network, granting said UT access to said wireless data network only if said $X_{WEST}$ is below said $X_{WMAX}$.

$X_{WEST}$ may be calculated/simulated in many different ways, depending on what parameter $X_W$ represents, e.g, if $X_W$ represents the total number users (UTs) currently communicating with a specific AP or the entire WLAN (total number, totNR, of UTs associated with an AP or the WLAN) then $X_{WEST}$ is simply the current totNR of $X_W$ incremented with 1, if $X_W$ is a SNR/SIR-value associated with a UT 640 currently communicating with the UTRAN, then $X_{WEST}$ may be calculated by decreasing the current average SIR/SNR-value of AP 665 to which UT 640 requests to perform handover, with a suitable statistical empirical value, or simply setting $X_{WEST}$ equal to the maximum current SIR/SNR-value of AP 665, but many possibilities exist.

Thus, said parameter $P_W$ may be a total traffic load in terms of throughput (Kb/s), a total number of users (UTs), the total power (W), the total number of carriers, time slots, codes, channels etc., for the wireless data network or for a specific access point of the wireless data network or a signal to noise/interference value (SNR, SIR) or packet delay value or BER-value or FER-value, requested by, or associated with, said UT 640.

In one embodiment, said criterion C is defined in the following way defining a minimum tolerable threshold value, $X_{WMIN}$, for said radio resource parameter $P_W$, being a QoS value in terms of throughput (Kb/s) or encryption security value settings, requested by said UT (640), estimating the effective value, $X_{WEST}$, of said parameter $P_W$ as a consequence of said UT (640) being granted access to said wireless data network, granting said UT (640) access to said wireless data network only if said $X_{WEST}$ exceeds said $X_{WMIN}$.

In another embodiment, said C is defined in the following way choosing a current parameter value, $X_C$, of said cellular radio network, being a parameter value representing the total traffic load associated with said cellular radio network or a specific base station (Node B 650) of said cellular radio network, estimating an effective value of a corresponding parameter, $X_{WEST}$, for said wireless data network in case said UT (640) is granted access to said wireless data network, said $X_{WEST}$ being a parameter value representing the total traffic load associated with said wireless data network or a specific access node, AP, (665) of said wireless data network, defining said C so as to grant said UT (640) access to said wireless data network only if said estimated $X_{WEST}$ is below said current $X_C$. For instance, if said $X_C$ of the UTRAN network is the relative throughput (percentage value of maximum throughput capacity, e.g. being 60% as an example) of Node B, to which UT 640 is currently associated, then said $X_{WEST}$ of the WLAN is the relative estimated relative throughput (percentage value of maximum throughput capacity, based on current value plus requested QoS throughput of UT 640) of AP 665 to which UT 640 requests a handover, etc. The UT 640 will thus be granted access to the WLAN only if $X_{WEST}$ is below 60%, in accordance with above example. A person skilled in the art realises how to form suitable estimate values for other relevant parameters.

In one embodiment, said C may be defined in the following way choosing a current parameter value, $X_C$, of said cellular radio network, being a parameter value representing the radio traffic channel quality of said UT (640) currently communicating with said cellular radio network, estimating an effective value for a corresponding traffic channel quality parameter, $X_{WEST}$, for a case wherein said UT (640) is communicating with said wireless data network, in case said UT (640) is granted access to said wireless data network, defining said C so as to grant said UT (640) access to said wireless data network only if said estimated $X_{WEST}$ exceeds said current $X_C$. For instance, if $X_C$ is a QoS throughput value of 1 Kb/s for UT 640, currently communicating with Node B 650, and UT 640 has a requested QoS throughput of e.g. 2 Kb/s, then UT 640 will be granted access to AP 665 of said WLAN only if the estimated throughput of UT 640 after a handover to AP 665 is estimated to exceed 1 Kb/s, i.e. AP 665 must have an available free throughput capacity exceeding 1 Kb/s and $X_{WEST}$ must exceed 1 Kb/s (+optionally a fix extra value to minimise ping-pong effects).

Figure 10B:
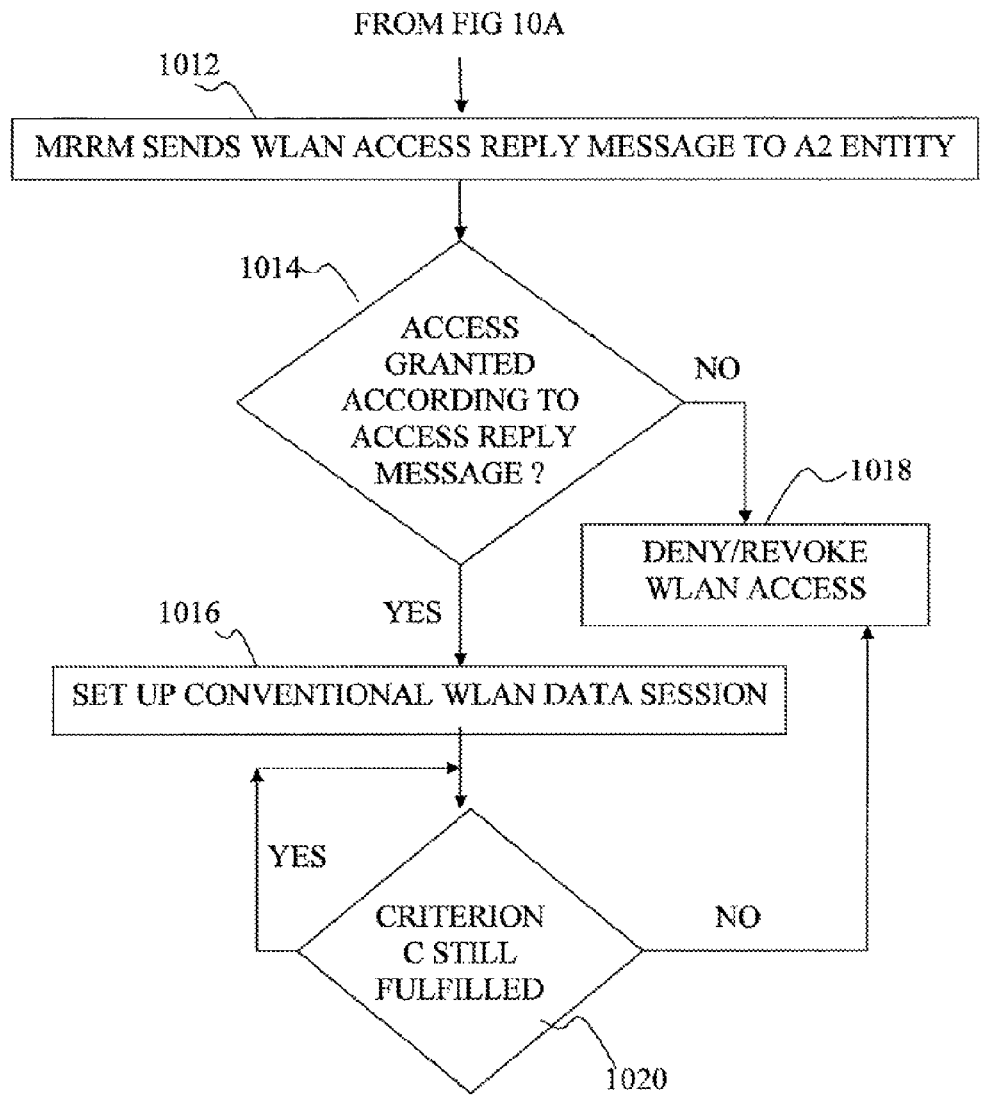

After that the MRRM entity has established whether said global access policy criterion C is fulfilled or not in step 1010, the method according to the invention proceeds to step 1012, illustrated in FIG. 10B.

In step 1012, the MRRM entity forms an access reply message, comprising an access grant identifier, e.g. a one bit "1" representing access granted and a one bit "0" representing access denied, and a UT identifier, e.g. the WLAN MAC address of UT 640. If said criterion C was found to be fulfilled for UT 640 in step 1010, then the access grant identifier is set to "1", otherwise to "0", in said access reply message. The ARM entity then sends the access reply message to the A2 entity.

In step 1014, the A2 entity receives the access reply message from the MRRM entity, extracts said UT identifier and access grant identifier, and decides to treat said UT (640) as authorised to access the WLAN only if the extracted access grant identifier indicates to grant UT 640 access to the WLAN, i.e. the access grant identifier is "1", in accordance with above example, and the method proceeds to step 1016. In case the access grant identifier is "0", the UT 640 is considered not to be authorised to access the WLAN by the A2 entity, in accordance with above example, and the method proceeds to step 1018.

In step 1016, the A2 accepts the WLAN access request of UT 640 and a conventional WLAN data communication session is set up between UT 640 and the WLAN via the AP 665. This is illustrated by actions 6, 7 and 8 in FIG. 11A. The method then proceeds to step 1020.

In step 1018, the authorisation of UT 640 to access the WLAN is denied/revoked, and the data communication session set up between UT 640 and the WLAN is blocked, alternatively shut down, in a conventional manner, since the UT 640 is not an authorised WLAN UT. In one embodiment, the UT 640 may renegotiate its WLAN access request, e.g. by decreasing a requested throughput value (Kb/s), i.e. the method may continue back to step 1006. This is illustrated by actions 6, 10, 11 and 12 in FIG. 11A-B.

In step 1020, the MRRM entity monitors whether said criterion C continues to be fulfilled after having instructed said A2 to grant authorization for said UT (640) in step 1012, e.g. by receiving RRIMs at regular intervals and performing adequate data processing for establishing the fulfillment of said C. This is illustrated by action 9 in FIG. 11B. A person skilled in the art realises how this may be carried out. As long as said criterion is fulfilled, the method according to the invention remains in step 1020. If said C is no longer fulfilled for said UT (640), then the ARM entity instructs said A2 to revoke the authorization for said UT to access said wireless data network, e.g. by forming and sending a WLAN access reply message to the A2 entity, which message normally comprises the UT's 640 WLAN address and the access grant identifier set to "0", in accordance with above example, and the method proceeds to step 1018.

Thus, the A2 entity may according to the invention e.g. be realized as a modified AAA RADIUS server application in RNC 630. In this way, in case of a handover from the UTRAN path to the WLAN path, the MRRM's decision on whether or not to accept the UT's 640 WLAN authentication request can be based on the entire integrated network's available radio resources, thereby allowing load balancing between the UTRAN and WLAN, and/or may be based on the UT's (640) security context settings previously established during the UMTS communication setup.

The A2 entity may reside in a separate network node being arranged to communicate with the wireless data network and the MRRM-entity according to the invention, or e.g. be co-located with the MRRM-entity, e.g. in the RNC 630 as illustrated in FIG. 6. The RNC 630 is being connected with said wireless data network and a cellular radio network wherein said A2 establishes whether a UT 640 is authorized to access the WLAN according to the method described above. The A2 entity network node may e.g. be a network server exploiting a RADIUS protocol or a DIAMETER protocol along with an EAP-, EAP-TLS-, EAP-TILS- or EAP-PEAP-protocol, as stated above.

The method according to the invention is realized by above described MRRM entity and A2 entity, which normally are realized by means of software program/s comprising program code means loaded in processing means, e.g. CPUs, at the various network nodes (or residing in the same network node) as described above, which code means when loaded in said processing means, executes at least one procedure realizing the method according to the invention, but other hardware options exist, obvious for a person skilled in the art. The software program/s may be stored in e.g. RAM memory/ies and on a computer readable medium, such as a CD-ROM, flash memory etc, allowing an efficient distribution/installation.

The method according to the invention described above may be modified in many ways. For instance, the MRRM entity may form a global authorisation policy, comprising a data base list of authorised/non authorised UTs, which is communicated to the A2 entity at regular intervals, e.g. by means of an authorisation policy update message, so that the A2 entity does not have to form and send a WLAN access request to the MRRM entity for each received UT WLAN access request, but instead the A2 entity updates its local data base list (look-up table), e.g. at regular intervals, when receiving said policy update messages from the MRRM. The policy update message comprises an authorization instruction, which may be a maximum tolerable parameter value of said WLAN, e.g. maximum number of UTs served by the WLAN or a specific node of the WLAN, or a maximum tolerable throughput (Kb/s). The A2 entity is modified accordingly in order to function properly together with the authorisation instruction of the MRRM entity. For instance, if the authorisation instruction consist of a maximum tolerable number of UTs being served by the WLAN, then the A2 entity first checks its conventional authorisation look-up table for establishing whether the UT 240 is authorised according to its local policy and thereafter checks if the WLAN may serve also said UT 240 without exceeding said maximum tolerable number of UTs and authorises said UT only if both these conditions are fulfilled. A person skilled in the art realises how to adapt the A2 entity accordingly. The MRRM entity and A2 entity may share a common authorisation look-up table, wherein only the MRRM is authorised to read/write from/in said look-up table, while the A2 entity may only read the authorisation status for individual UTs. This arrangement may be advantageous e.g. in case the MRRM entity and A2 entity reside in different network nodes, wherein the look-up table resides in the same network node as the A2 entity, e.g. in case the MRRM entity is realised as a relatively de-centralised process, e.g. being realised as a distributed MRRM-function in a plurality of network nodes wherein different parts of the MRRM function may update the look-up table dynamically and independently from each other. Furthermore, also the AAA1 authorisation entity of the 3GPP UTRAN may be modified in a similar way as the AAA2 authorisation entity is modified according to the above description into the A2 entity. Thus, the invention provides a possibility e.g. to control the access to a cellular radio network based on the WLAN radio resource information, such as traffic load, radio channel quality etc. A person skilled in the art realises how to realise such an analogous modification.

Since existing authorisation- and RRM protocols may be re-used, as described above, the invention provides an efficient way to integrate various radio access networks. By having the MRRM entity exploiting the A2 entity for the physical network access control, an efficient network access control is obtained allowing a cost efficient integration of various radio access networks. The invention also provides a possibility to obtain an efficient load balancing between the radio access networks, thereby decreasing the overall interference and increasing the total capacity of the integrated network. By placing the MRRM entity and A2 entity in the RNC node as described above, network signalling and packet delays are minimised.

The principles of the present invention have been described in the foregoing by examples of embodiments or modes/examples of operations, i.e. the case wherein one access network domain is a WLAN and another access network domain is a UTRAN for the case of a data session handover from a UTRAN transmission path to a WLAN transmission path. However, as already stated, the invention is applicable for any radio access network domains and many modifications and/or combinations are possible. Therefore, the invention should not be construed as being limited to the particular embodiments/working examples discussed above, and it should be appreciated that variations may be made in those embodiments/working examples by persons skilled in the art, without departing from the scope of the present invention as defined by the appended claims.

The invention claimed is:

1. A method for assisting the control of a User Terminal's, UT's, access to an access network domain in a radio communications network, said method to be used by a Multi Radio Resource Management, MRRM, function of said communications network, said MRRM function being arranged to communicate with a first radio access network domain to which a first authorization entity, A1, authorizes UTs access, and to communicate with at least a second radio access network domain to which a second authorization entity, A2, authorizes UTs access, said method comprising the steps of:

receiving, from said second authorization entity, A2, an indication that said UT is authorized to access said second access network domain according to a local authorization policy, wherein said local authorization policy forms a pre-requisite condition for granting UT access to the second authorization entity;

receiving at least one radio resource information message, RRIM, from said second access network domain, said message comprising at least one parameter value, $X_2$, of at least one radio resource parameter, $P_2$, related to the traffic load and/or the radio resource consumption and/or the characteristics of at least one radio traffic channel, associated with said second access network domain, defining a criterion, C, for granting said UT access to said second access network domain, wherein said C is a function of at least said parameter value, $X_2$, establishing whether said criterion, C, is fulfilled or not for said UT, instructing said second authorization entity, A2, that said UT is authorized to access said second access network domain if said pre-requisite condition is fulfilled and if said criterion, C, is fulfilled for said UT and instructing said second authorization entity, A2, that said UT is not authorized to access said second access network domain if said criterion, C, is not fulfilled for said UT, wherein said MRRM function resides in a same network node as said second authorization entity, A2; and wherein the definition of said criterion C comprises the following steps:

defining a minimum tolerable threshold value, $X_{2MiN}$ for said radio resource parameter $P_2$, being a QoS value requested by said UT, estimating the effective value, $X_{2EST}$, of said parameter $P_2$ as a consequence of said UT being granted access to said second access network domain, and granting said UT access to said second access network domain only if said $X_{2EST}$ exceeds said $X_{2MIN}$.

2. The method according to claim 1 wherein said $X_2$ represents a total traffic load associated with said second access network domain in terms of throughput (Kb/s), total number of served users (UTs), interference value (e.g. in terms of W or SIR), total number of channel access collisions, transmission power (W), or represents a radio resource consumption in terms of transmission power (W), total number of served UTs, total number of used codes or sub-carriers or time slots, associated with said second access network domain, or represents a radio channel quality of said UT, in terms of a SNR-value or a SIR-value or a BER-value or a FER-value or throughput-value (Kb/s) or packet delay value (ms).

3. The method according to claim 1 wherein said first access network domain forms a 3GPP cellular radio network and said second access network domain forms a wireless data network according to an IEEE 802 standard or according to a standard Internet protocol for mobile applications, MIP, or wherein said second access network domain forms a 3GPP cellular radio network and said first access network domain forms a wireless data network according to an IEEE 802 standard or according to a standard Internet protocol for mobile applications, MIP.

4. The method according to claim 1 further comprising the steps of:

monitoring whether said criterion C continues to be fulfilled after having instructed said A2 to grant authorization for said UT, establishing that said C is no longer fulfilled for said UT, instructing said A2 to revoke the authorization for said UT to access said second access network domain.

5. The method according to claim 1 further comprising the steps of:

forming a global access policy concerning at least one UT's authorization to access said second access network domain, wherein said global policy is a function of said criterion, C, monitoring radio resource parameter values relating to said second access network domain and/or said first access network domain and establishing the authorization status for at least said UT according to said global policy, detecting the change of authorization status for at least said UT, according to said global policy, forming a policy update message comprising an authorization instruction, sending said policy update message to said authorization entity application, A2, responsible for establishing whether said UT is authorized to access said second access network domain.

6. The method according to claim 5 wherein said authorization instruction comprises a maximum or minimum tolerable parameter value associated with said second access network domain.

7. The method according to claim 1 wherein the step of instructing said second authorization entity, A2, comprises the following step:

sending an access network domain access reply message comprising an access grant identifier indicating the authorization status of said UT based on said C, and comprising a UT identifier, to said A2 entity.

8. The method according to claim 1 wherein said MRRM function is realized as a MRRM entity residing in a single network node and wherein said RRIM message/s comprises a plurality of parameter values related to at least one radio resource parameter, or a set of radio resource parameters, of said radio communications network and wherein said C is a function of said plurality of parameter values.

9. A network node comprising a Multi Radio Resource Management, MRRM, function for assisting the control of a User Terminal's, UT's, access to an access network domain, said MRRM function being arranged to communicate with a first access network domain in an integrated radio communications network to which domain a first authorization entity, A1, authorizes UTs access, and being arranged to communicate with a second access network domain in said communications network to which domain a second authorization entity, A2, authorizes UTs access, wherein said network node is configured to perform steps comprising:

receiving, from said second authorization entity, A2, an indication that said UT is authorized to access said second access network domain according to a local authorization policy, wherein said local authorization policy forms a pre-requisite condition for granting UT access to the second authorization entity;

receiving at least one radio resource information message, RRIM, from said second access network domain, said message comprising at least one parameter value, $X_2$, of at least one radio resource parameter, $P_2$, related to the traffic load and/or the radio resource consumption and/or the characteristics of at least one radio traffic channel, associated with said second access network domain, defining a criterion, C, for granting said UT access to said second access network domain, wherein said C is a function of at least said parameter value, $X_2$, establishing whether said criterion, C, is fulfilled or not for said UT, instructing said second authorization entity, A2, that said UT is authorized to access said second access network domain if said pre-requisite condition is fulfilled and if said criterion, C, is fulfilled for said UT and instructing said second authorization entity, A2, that said UT is not authorized to access said second access network domain if said criterion, C, is not fulfilled for said UT, wherein said second authorization entity, A2, and said MRRM function reside in said network node; and wherein the definition of said criterion C comprises the following steps:

defining a minimum tolerable threshold value, $X_{2MiN}$ for said radio resource parameter $P_2$, being a QoS value requested by said UT, estimating the effective value, $X_{2EST}$, of said parameter $P_2$ as a consequence of said UT being granted access to said second access network domain, and granting said UT access to said second access network domain only if said $X_{2EST}$ exceeds said $X_{2MIN}$.

10. The network node according to claim 9, further being arranged as a Radio Network Controller, RNC, being arranged to communicate with said first access network domain via a first data port, and to communicate with said second access network domain via a second data port.

11. A non-transitory data storage medium having stored thereon a plurality of instructions including instructions which, when executed by a processor, cause the processor to perform the steps of a method for assisting the control of a User Terminal's, UT's, access to an access network domain in a radio communications network, said method to be used by a Multi Radio Resource Management, MRRM, function of said communications network, said MRRM function being arranged to communicate with a first radio access network domain to which a first authorization entity, A1, authorizes UTs access, and to communicate with at least a second radio access network domain to which a second authorization entity, A2, authorizes UTs access, said method comprising the steps of:

receiving, from said second authorization entity, A2, an indication that said UT is authorized to access said second access network domain according to a local authorization policy, wherein said local authorization policy forms a pre-requisite condition for granting UT access to the second authorization entity;

receiving at least one radio resource information message, RRIM, from said second access network domain, said message comprising at least one parameter value, $X_2$, of at least one radio resource parameter, $P_2$, related to the traffic load and/or the radio resource consumption and/or the characteristics of at least one radio traffic channel, associated with said second access network domain, defining a criterion, C, for granting said UT access to said second access network domain, wherein said C is a function of at least said parameter value, $X_2$, establishing whether said criterion, C, is fulfilled or not for said UT, instructing said second authorization entity, A2, that said UT is authorized to access said second access network domain if said pre-requisite condition is fulfilled and if said criterion, C, is fulfilled for said UT and instructing said second authorization entity, A2, that said UT is not authorized to access said second access network domain if said criterion, C, is not fulfilled for said UT, wherein said Multi Radio Resource Management, MRRM, function resides in a same network node as said second authorization entity, A2; and wherein the definition of said criterion C comprises the following steps:

defining a minimum tolerable threshold value, $X_{2MiN}$ for said radio resource parameter $P_2$, being a QoS value requested by said UT, estimating the effective value, $X_{2EST}$, of said parameter $P_2$ as a consequence of said UT being granted access to said second access network domain, and granting said UT access to said second access network domain only if said $X_{2EST}$ exceeds said $X_{2MIN}$.

* * * * *